United States Patent
Rummler et al.

(10) Patent No.: US 6,517,711 B1
(45) Date of Patent: Feb. 11, 2003

(54) WASTE TREATMENT SYSTEM

(75) Inventors: John M. Rummler, Kittery Point, ME (US); Thomas R. Beal, Barrington, NH (US); Guy D. Marchesseault, Boxford, MA (US); Christine L. Robblee, Milton Mills, NH (US); Steven McHenry, Eliot, ME (US)

(73) Assignee: Wastech International Inc., Portsmouth, NH (US)

( * ) Notice: Subject to any disclaimer, the term of this patent is extended or adjusted under 35 U.S.C. 154(b) by 0 days.

(21) Appl. No.: 09/410,055

(22) Filed: Oct. 1, 1999

Related U.S. Application Data

(60) Provisional application No. 60/103,129, filed on Oct. 2, 1998.

(51) Int. Cl.$^7$ .......................... B01D 27/08; B01D 27/14; B01D 29/54; B01D 29/66; C02F 11/10

(52) U.S. Cl. ................ 210/185; 210/232.1; 210/333.01; 210/195.1; 210/203; 210/316; 210/422; 210/427; 210/497.01; 210/496; 210/510.1; 210/188

(58) Field of Search ............. 210/333.01, 323.1–323.2, 210/311, 316, 420, 422, 427, 428, 425, 436, 184–186, 203, 167, 416.1, 314, 332, 340, 490, 500.25, 500.26, 315, 510.1, 504, 539, 188, 182, 195.1, 497.01; 55/482, 485, 486–487; 251/193, 203, 326–329; 137/375

(56) References Cited

U.S. PATENT DOCUMENTS

| | | | | |
|---|---|---|---|---|
| 1,260,277 A | * | 3/1918 | Ranney | |
| 1,370,685 A | * | 3/1921 | Denker et al. | |
| 3,357,566 A | * | 12/1967 | Schmid et al. | |
| 4,085,051 A | * | 4/1978 | Kaminsky et al. | 210/333.01 |
| 4,178,964 A | * | 12/1979 | Moore et al. | |
| 4,923,487 A | * | 5/1990 | Bogart et al. | 55/482 |
| 5,447,630 A | * | 9/1995 | Rummler | 210/186 |
| 5,725,762 A | * | 3/1998 | Beal et al. | 210/181 |
| 5,843,304 A | * | 12/1998 | Marchesseault et al. | 210/143 |
| 5,853,579 A | * | 12/1998 | Rummler et al. | 210/170 |
| 6,156,192 A | * | 12/2000 | Rummler et al. | 210/153 |

\* cited by examiner

Primary Examiner—Matthew O. Savage
Assistant Examiner—Marianne Ocampo
(74) Attorney, Agent, or Firm—Oblon, Spivak, McClelland, Maier & Neustadt, P.C.

(57) ABSTRACT

An improved waste treatment system and improved waste treatment system components are provided. In a preferred form, a waste stream is initially separated into primarily solid and primarily liquid components, and the liquids are then fed to a filter assembly. The filter assembly includes a pair of filter elements, and the flow is introduced into the filter assembly at a location between the filter elements. During a filtering operation, the liquid is pumped so that it is drawn through one of the filter elements. Periodically, the flow can be reversed, so that it is directed through the other filter element, at which time the first filter element can also be purged or back flushed. Advantageous waste treatment system arrangements are also provided for household, commercial, or transportation/marine use.

31 Claims, 17 Drawing Sheets

WASTE TREATMENT SYSTEM

This application claims the benefit of Provisional Application No. 60/103,129, filed Oct. 2, 1998.

BACKGROUND OF THE INVENTION

1. Field of the Invention

The invention relates to systems for treating waste produced at residential or commercial sites, or on transport vehicles/vessels (e.g., on board rail cars or marine vessels).

2. Discussion of Background

Our earlier patents/applications disclose waste treatment systems in which an incoming waste liquid is initially separated into primarily solid and primarily liquid components, and the solid and liquid components are then further treated. Such treatment systems are disclosed in our prior U.S. Pat. Nos. 5,447,630; 5,725,762; and 5,843,304, which are incorporated herein by reference. These systems can be utilized, for example, for household waste, where sewage systems are unavailable or overly burdened, or in low lying areas where septic systems are also unfeasible. These systems are also advantageous in that they are capable of providing resulting effluents which are more environmentally satisfactory as compared with conventional treatment systems. Systems as disclosed in our earlier patents/applications can also be utilized in commercial or apartment complexes, on board marine vessels and other transport vehicles (such as rail systems), or with portable toilet facilities.

SUMMARY OF INVENTION

The present invention provides improvements to certain components, and overall system improvements (for at least certain applications), to the systems disclosed in our above-mentioned earlier patents/applications which are incorporated herein by reference. It is therefore an object of the invention to provide an improved waste treatment system which can be used at various locations for treating waste at the site, or close to the site, at which the waste is created.

It is a further object of the invention to provide a waste treatment system which is compact so that it can be readily used at various locations or on various vehicles or vessels, with the entire or substantially the entire system housed as a unit.

It is another object of the invention to provide an improved filtration system which can be utilized as a component of a waste treatment system. The filtration system can be housed as a unit with other components of a treatment system, or the filtration assembly can be provided as a separate component or a component which is installed in a system designed/assembled for a particular facility.

It is a further object of the invention to provide an improved valve assembly for isolating an incineration assembly from portions of the treatment system which are upstream of the incineration assembly.

The above and other objects and advantages are achieved in accordance with the present invention. In accordance with a presently preferred embodiment which can be utilized, for example, as a household treatment system, the waste is initially separated by a separator, which separates the waste stream into a primarily liquid component and a primarily solid component. The primarily solid component is fed to an incineration device, while the primarily liquid component is fed to a filter assembly. For certain applications, such as a household, or a small marine vessel, the system is preferably housed as a unit, with the unit including the separator, the incineration assembly, and the filter assembly. For larger applications, the components can be assembled in various configurations. For example, for a large marine passenger or military vessel, plural filter assemblies can be associated with a single separator, so that the various filters accommodate larger amounts of liquid. After filtration of the liquids, additional treatment, e.g., ultraviolet treatment, can optionally be provided, in large or small systems. In addition, solids from the separator can be sent to a solids collection vessel which periodically doses the solids to an incineration device, or the solids from the separator can be forwarded to plural incineration assemblies.

The separator is as disclosed in our earlier patents/applications, and is advantageous in a number of respects. For example, the separator requires no input energy, yet provides a high degree of separation between liquids and solids, so that first and second output components are provided, one of which is primarily liquid, and the other of which is primarily solid waste. The separator is also advantageous in that it can operate continuously (even during a power outage) and can handle large flow volumes, with the waste separated as it flows continuously through the separator. Thus, for most if not all applications, upstream holding chambers (i.e., upstream from the separator) can be avoided. In other words, waste flows are preferably directly sent to the separator from their source, without an intermediate holding tank. The inventors have recognized upstream holding chambers/tanks as undesirable in that the solids can dissolve or emulsify, making downstream separation and treatment more difficult or less effective. Since the separator handles a significant volume of waste in a relatively short period of time as the waste flows through the separator, the downstream components will generally be the limiting factor with respect to the amount of time required to treat the solid and liquid components of the waste. Therefore, in larger systems, a single separator (or, for very large systems, a small number of separators) can be used in conjunction with plural or multiple downstream filter and/or incineration assemblies.

In accordance with one aspect of the invention, an improved filter assembly is provided. Our earlier systems utilized, for example, a pair of side-by-side filter assemblies, so that when one of the assemblies is being cleaned (e.g., by subjecting the filter elements to microwave energy), the liquid flow could be directed to the other filter assembly. With the present invention, an "up-down" filter assembly is provided, in which a pair of filter elements is disposed in the same filter assembly. The direction of liquid flow through the assembly is periodically changed so that in a first mode of operation the liquid is filtered through one of the filter elements, while in a second mode of operation the liquid passes through a second filter element. Preferably, during this second mode of operation, the first filter element is being purged or back flushed.

The filter elements are also cleaned utilizing microwave energy. However, with the arrangement of the present invention, the cleaning operation utilizing microwave energy is required much less frequently, thus allowing for longer periods of operation between cleaning cycles and reducing the amount of energy required for cleaning. In particular, the alternating ("up-down") flow assembly moves the debris or particles which can accumulate upon a filter, to reduce clogging, so that a greater amount of liquid can be handled by the filter assembly between cleaning cycles (i.e., cleaning with microwave energy). In a preferred form of the invention, the filter assembly also includes one or more improved filter elements. In particular, the filter element is a dual density or multiple density filter element in which the liquid flow initially passes through the more dense filter portion (i.e., having smaller pores, or in other words, a higher pore density), and the liquid then passes through the less dense filter element (having larger pores, or in other words, a lower pore density). This filter element is less susceptible to particles becoming clogged deeply within the filter element (i.e., at locations which are difficult to clean), since the liquid is first exposed to the finer portion of the filter element. The coarser or less dense portion of the filter element provides support for the finer (higher pore density) portion of the filter element, and also provides for improved air flow, for example, when an incineration cleaning operation is being performed on the filter element. The less dense portion of the filter element is also advantageous in that liquids are more easily drained from the filter element since liquids are less susceptible to retention by capillary action of the larger pores/passages extending through the less dense filter portion.

Although various system components and system assemblies are shown, it is to be understood that various components could be utilized separately and/or can be substituted with other components. For example, the improved filter assembly could be replaced with other types of filter assemblies, for example, assemblies described in our earlier patents/applications. However, the filter assembly as disclosed herein is presently preferred. It is also to be understood that various components could be utilized separately if desired in a given system, for example, if a waste stream is such that a filtration system is not required, or if a waste stream is such that the filtration assembly is the only treatment component required. Further, components such as the solids incinerator and/or the filter assembly can be advantageously utilized with various types of separators, with the separator selected based upon the waste stream being treated (for example, a cyclonic or other type of separator or a dewatering device may be desirable where there has been some break-down or maceration of the solids such as when the waste stream is from a vacuum toilet). Of course, the quantity and arrangement of the components (e.g., number of filter assemblies, number of solids incinerators, number of separators, etc.) could also vary depending upon the facility to which the waste treatment system is to be applied as will be apparent from the description herein.

DETAILED DESCRIPTION OF THE PREFERRED EMBODIMENTS

Figure 1:
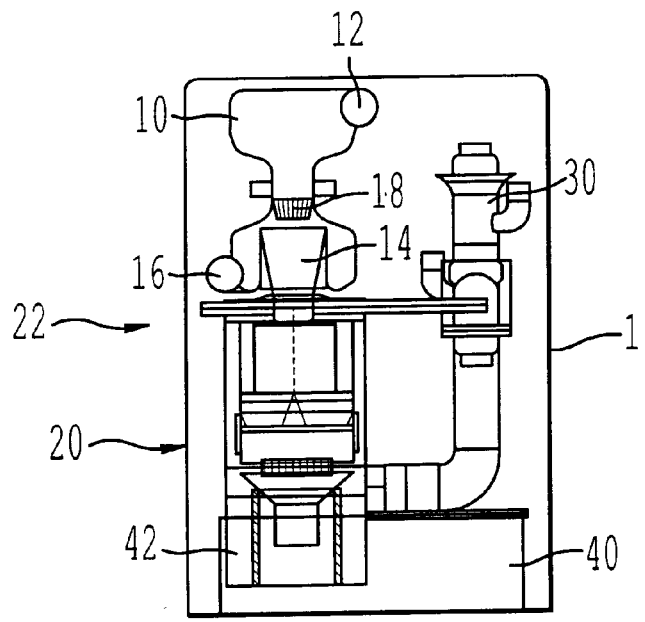
FIG. 1 is a schematic representation of a waste treatment system of the present invention.

Referring now to the drawings wherein like reference numerals designate the same or corresponding parts throughout the several views, FIG. 1 illustrates a treatment system in accordance with the present invention. As shown in FIG. 1, the system can be provided in a common housing 1, for example, as a residential appliance. However, various other structures can be utilized for maintaining/arranging the various components of the treatment system. The system of FIG. 1 includes a separator 10, an incineration assembly 20, and a filter assembly 30. In addition, a surge tank 40 is provided for receiving liquids from the separator, and the liquids which are forwarded to the filter assembly 30 are drawn from the surge tank 40. A sump 42 is disposed below the incineration assembly 20 in order to collect any residual water/liquid which drains from the solids in the incineration assembly 20.

Details of the separator and of the incineration assembly or fire tube are disclosed in our previous patents/applications, which are identified earlier herein and which are incorporated herein by reference. Since the separator and incineration assembly are as described in our earlier patents/applications (with some modifications as described herein), a detailed description of every aspect of these components is not provided herein. In accordance with one of the advantageous aspects of the present invention, an improved valve assembly 22 is provided between the separator and the incineration assembly as described in further detail hereinafter. FIG. 1 provides a simplified view of the various components of the system, with certain elements omitted (e.g., piping and valving) for clarity of the illustration. To summarize briefly, the separator 10 receives an incoming waste stream through inlet 12. As the waste stream passes through the separator 10, it is separated into first and second components. The first component is primarily solids, and drops through an outlet cone 14. The second component is primarily liquid and exits through a liquid outlet 16 of the separator 10. The separation occurs passively, or in other words, there is no input power required to the separator 10, and the separation occurs as the waste stream flows through the separator.

The components of the waste stream are separated by virtue of the configuration of the separator, and the separation is also assisted by a wire guide 18 disposed in a necked portion of the separator, with the wire guide 18 formed of, e.g., a plastic, metal or Teflon (polytetrafluoroethylene) material or combinations of such materials. The liquids exiting liquid outlet 16 pass to the surge tank 40 and the solids are dropped into the incineration in assembly 20. A knife or gate valve 22 is disposed between the separator 10 and the incineration assembly 20. The gate valve 22 functions to: (1) isolate the separator from the incineration assembly so that, when solid waste is being incinerated, additional waste is not being dropped into the incineration assembly and any combustion products (exhaust gases or particulates) do not escape from the incineration assembly through the valve, and (2) the gate valve defines the top end of the microwave assembly, thus defining the geometry of the microwave chamber within which the waste is incinerated.

Figure 2A:
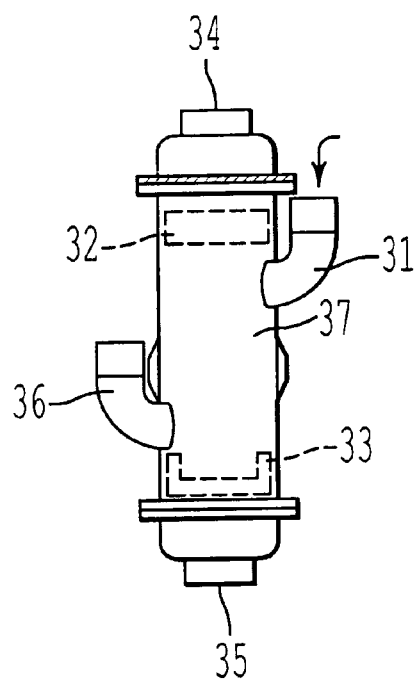
FIGS. 2A–2C depict a presently preferred filter assembly in accordance with the present invention.
Figure 2C:
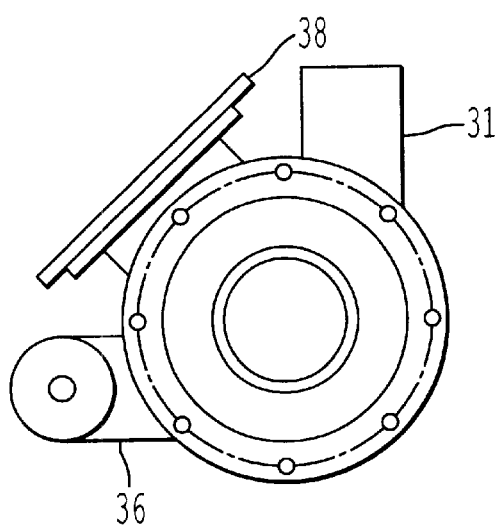
Figure 2B:
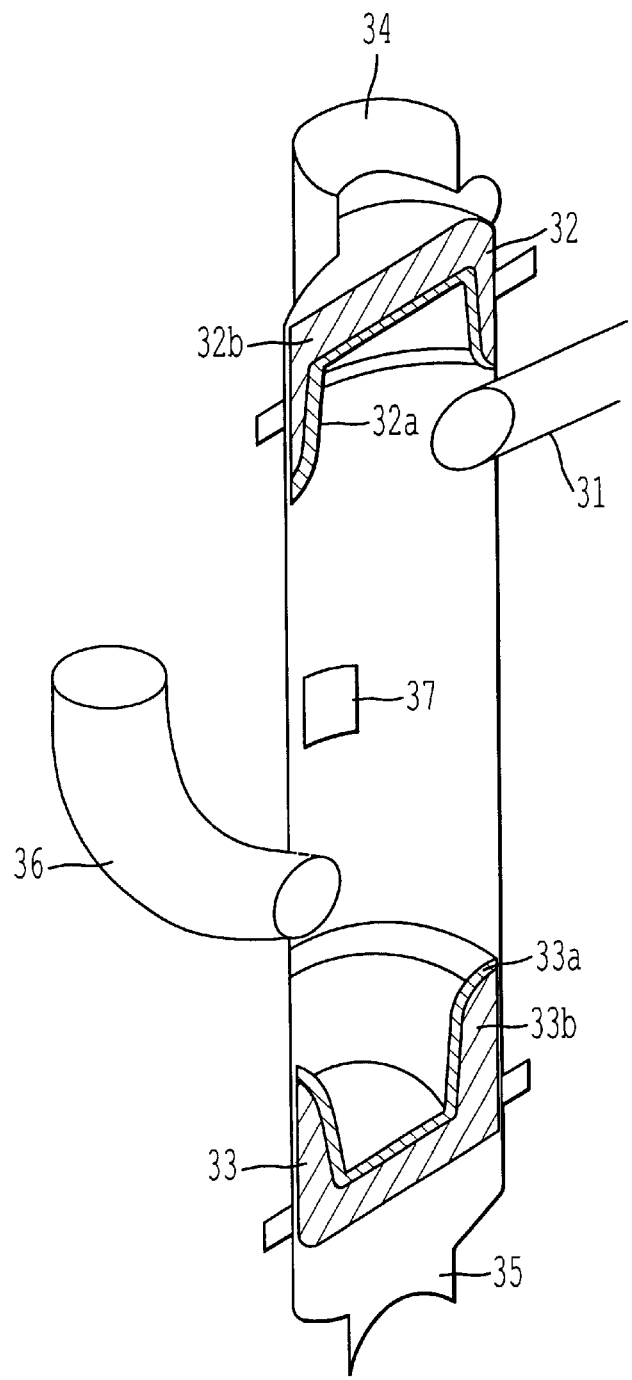

Referring now to FIGS. 2A and 2B, the exterior of the filter assembly is shown. As noted earlier, in our earlier systems, a side by side or redundant filter system was provided, so that one of the assemblies could perform a filtration operation while the other is being cleaned with microwave energy. The filter assembly of the present invention is advantageous in that only a single filter assembly is needed, and a greater amount of time can elapse (or more precisely, a larger amount of fluid can be handled) between incineration cleaning cycles (i.e., microwave cleaning operations). In addition, since only a single assembly is required, the filter assembly is more compact, so that the treatment system can be more conveniently housed as a compact unit in a single housing 5 (FIG. 1). Of course, it is to be understood that, for certain applications, multiple filter assemblies could be provided depending upon the volume of liquid which must be handled. However, as a result of the improved construction of the filter assembly of the present invention, a separate redundant filter assembly is not needed simply to accommodate the liquid flow during an incineration cleaning operation. For example, in the context of residential use, the incineration cleaning operation can be sufficiently infrequent that it can be timed to occur during periods in which the system is typically not called upon to handle an incoming flow. In any case, regardless of the manner in which the system or components of the system are combined, the space requirements for the system can be reduced, making the system better suited (and more efficient) for use not only in residential applications, but also on board transport vehicles or vessels. In addition, since the cleaning operations are not needed as frequently, less energy is required for cleaning the filters.

The components and operation of the filter assembly will become better understood with reference to FIGS. 2A–2C. The inlet for the filter assembly is shown at 31, and receives the liquid from the surge tank 40. As noted earlier, the filter assembly is referred to as an "up-down" filter, since filter elements are provided in the top and in the bottom of the filter assembly, and since the flow direction is periodically reversed. In particular, a first filter is provided in the upper portion of the filter assembly as represented schematically in broken line at 32 of FIG. 2A, while a filter element is also provided in the bottom of the filter assembly as represented at 33.

As shown at 32 in FIG. 2A, the filter elements can be disk-shaped, or the filter elements can be cup-shaped as shown at 33 (e.g., one of the filter elements can be cup-shaped as shown in FIG. 2A, both of the filter elements can be disk-shaped, or both of the filter elements can be cup-shaped as shown in FIG. 2B). The use of a cup-shaped filter element can be beneficial in providing a larger filter surface area. In accordance with a presently preferred form, a disk-shaped filter 32 is provided as the top filter, since the top filter 32 is periodically purged or back flushed and it is believed that a disk-shaped filter is likely better suited for back flushing. A cup-shaped filter is believed preferable for the bottom filter 33, since during the back flushing operation of the top filter, liquids are drained through the bottom filter as will be described further hereinafter, and a cup-shaped filter is believed better suited for this purpose. Preferably, a space is provided between the outer wall of the cup-shaped filter and the inner wall of the filter assembly 37 (except where support or fastening of the filter is required) so that liquids can drain/flow through both the bottom and sides of the filter element. It is to be understood that variations in the shapes and combinations of shapes of the filter elements may also be utilized.

Liquid outlets are provided in the top and bottom of the assembly as represented at 34, 35 in FIGS. 2A and 2B. To filter a liquid, the liquid is drawn through the filter assembly by a pump which is disposed downstream from the filter assembly. By providing a pump downstream from the filter assembly, the pump is not disturbed (clogged or dirtied) by debris which can be entrained in the liquid passing into the filter. The filter assembly also includes an exhaust outlet 36 to exhaust gases during the incineration cleaning of the filter elements with microwave energy. Depending upon the piping requirements and space constraints, the various inlet/outlet conduits can be elbowed as shown at 31, 36 in FIG. 2A, or they can be straight as shown at 31 in FIG. 2B.

During a first mode of operation, the pump draws liquids (which enter the filter assembly through the inlet 31) through the top filter element 32. During this first mode of operation, liquids will typically not be passing through the bottom filter element 33, except for possibly some seepage or stray liquid. In the preferred embodiment a pressure sensor and/or a vacuum switch is provided, and when the pressure drop across the filter element 32 exceeds a desired value (indicating that the filter element 32 is becoming clogged), the flow direction through the filter assembly is changed to a second mode of operation. Alternately, if desired, the shifting to the second mode of operation can occur on a periodic or timed basis. However, a pressure sensor and/or vacuum switch arrangement is preferred, since the filter element can clog at varying rates depending upon the amount of debris in the liquid and the frequency/volume of use.

The second mode of operation is effected by, instead of pumping the liquid through the top filter element 32, pumping the liquid so that it is drawn through the lower filter element 33. In addition, liquid (the same liquid being filtered, or alternately, water) is preferably fed through the top opening 34 of the filter assembly and through the top filter element 32 to perform a filter purging or back flushing operation. This change to the second mode of operation is effective in removing or dislodging solid/particulate material which has accumulated in the first filter element 32 so that further filtering can be performed with the filter element 32, and the microwave cleaning operation need not be performed as frequently.

Although it is possible to, for example, filter through the top filter 32 for a predetermined time, and then filter through the bottom filter 33 for a similar period of time, it is presently preferred to change to the second mode of operation in which the liquid passes through the second filter element 33 for a relatively short period of time, for example, for ten seconds to purge the first filter element 32. In a presently preferred form, as discussed in further detail hereinafter, a single pump is disposed downstream of each of the filter elements 32, 33, with the outlet from which the liquid is drawn (outlet 34 or 35) alternated by appropriate piping and valving so that in the first mode of operation the pump draws the liquid through the upper filter, while in the second mode, the same pump draws liquids through the lower filter and pumps liquids through the top filter. The liquid exiting outlet 35 during the unclogging or back flushing operation can optionally be returned to the surge tank 35 so that this liquid is later filtered again through the top filter element 32 after the unclogging or back flushing operation has been finished. However, in a presently preferred form, the liquid is drawn through the same pump utilized for filtering liquids through the top filter, and the liquid is then either pumped to the top filter for back flushing and/or the liquid can be pumped out of the system.

As should be apparent from the foregoing, the liquid from the surge tank 40 is thus fed to the inlet 31 of the filter assembly, and is drawn upwardly through the filter element 32 in the top or upper portion of the filter assembly utilizing a pump (e.g., a moyno pump) disposed downstream of the outlet 34. To prevent or eliminate clogging of the filter element 32, a purge cleaning operation can periodically occur in which the flow is drawn downwardly through the filter element 33, and a flushing liquid is directed through the opening 34 for back flushing the filter 32. The periodic purging can be based upon sensed pressure information, after a period of time as elapsed, or after a volume of flow or number of filtering cycles has been performed.

Thus, the filter is referred to as an "up-down" filter since the flow is directed upwardly during a first mode of operation, and then downwardly during a second mode of operation. Of course, it is to be understood that other positioning arrangements of the filter elements is possible. For example, rather than a vertically disposed chamber 37, a horizontal chamber could also be utilized in which the filter elements are horizontally spaced from one another (rather than vertically as shown in the present embodiment). It is to be understood that other shapes and configurations are also possible.

The filter arrangement of the present invention need only be cleaned utilizing microwave energy one to two times (most likely once for typical residential applications) per day, since the filter assembly can handle approximately 200 gallons of household waste before cleaning with microwave energy is needed. By way of example, and not to be construed as limiting, a filter assembly suitable for typical residential requirements (200 gallons per day) can include filter elements of approximately three-fourths of an inch in thickness, with the dimensions of the overall assembly approximately four inches in diameter, and seventeen inches in height (diameter and height of chamber 37). An assembly of this size can readily accommodate 200 gallons of liquid per day, and can be capable of filtering as much as 500 gallons per day. Where the waste treatment requirements exceed this level, larger filter assemblies could be utilized, or multiple filter assemblies could be provided. Liquids will be drawn through a filter assembly of the aforementioned size at a rate of approximately 5 gallons per minute, with the surge tank holding approximately 30 to 50 gallons for household applications. Of course, the size of the surge tank can also vary. Preferably, the filter assembly should be able to accommodate 100 gallons and preferably at least 25 gallons before cleaning is required.

The top and bottom filters can have the same construction, or since the liquid only passes through the bottom filter element 33 for a short period of time, the bottom filter can be provided with a lower pore density or, in other words, the bottom filter can be more coarse (larger pore openings). By way of example, and not to be construed as limiting, the top filter can have a porosity of 30–65 pores per inch(ppi)with a range of 40–50 ppi presently preferred, while the bottom filter element can have a porosity of approximately 30–65 ppi with a range of 30–40 ppi presently preferred. In addition, as discussed in further detail hereinafter, the filter elements will preferably each be dual density filter elements, with the downstream portions of the filter elements having a larger pore size (lower pore density).

With the arrangement of the present invention, the effluents exiting the filter assembly can readily attain or exceed the requirements of "secondary treatment standards" for total suspended solids (TSS) of typical municipal systems (30 ppm TSS). Although the FIG. 1 arrangement of the present invention will typically not meet the secondary treatment standards for biochemical oxygen demand limits (BOD) of 30 ppm, the arrangement nevertheless results in substantial BOD reduction, on the order of 50–75 percent. For example, a waste stream having an incoming BOD of 240 ppm has achieved a reduction to 80 ppm. Although the arrangement typically will not meet secondary treatment standards for BOD limits, the effluent liquid exiting the filter assembly is suitable for discharge into a leach field, into certain public waterways, or for discharge from a marine vessel.

Figure 7:
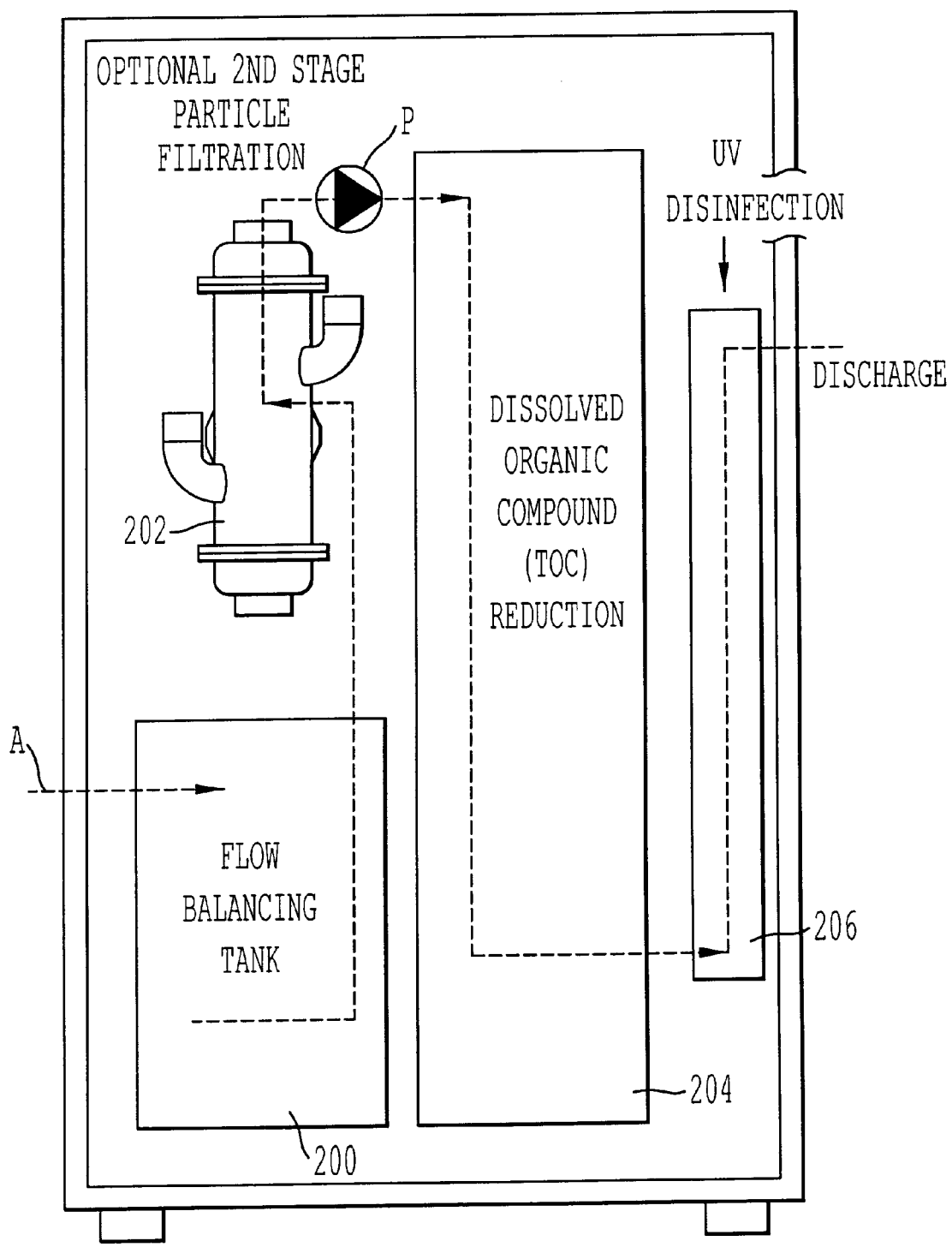
FIG. 7 schematically depicts an assembly of optional components for further treatment of liquids exiting the system depicted in FIGS. 1 and 3.

If desired, finer filtering elements can be provided to better exceed the secondary treatment standards for TSS. In addition, as disclosed in our earlier patents/applications, it is also possible to further treat the liquids downstream from the filter assembly, for example, with an oxidant and/or with additional radiation (microwave or ultraviolet). In addition, or alternatively, another filter media (e.g., molded plastic, sand or silica, or a non-woven fabric media) can be utilized to provide a biologically active surface (bio-filter) upon which a bacterial film grows, which consumes the organic content of the waste stream. With the additional liquid treatment (i.e. in addition to the arrangements depicted in FIGS. 1 and 3 of the present invention) the BOD can be reduced to below 30 ppm. As noted above, the additional liquid treatment can be provided as an oxidant treatment and/or additional radiation as disclosed in our earlier patents/applications. Referring to FIG. 7, a further example of an additional liquid treatment assembly is shown. It is to be understood that the additional liquid treatment could include one or more of the components shown in FIG. 7, depending upon the waste stream being treated and depending upon the desired quality of the final effluent. In the arrangement of FIG. 7, the flow which exits the FIG.1/FIG. 3 assembly enters a flow balancing tank 200 as indicated by arrow A. The flow balancing tank 200 acts as a buffer for the incoming flow of arrow A, so that the flow can then be sent to an additional (optional) up-down filter 202. The up-down filter 202 can generally be the same as that of the FIG. 1/FIG. 3 assembly, however, the filter assembly can have a finer pore size (higher pore density) for further particle filtration. The liquid is drawn through the secondary particle filter 202 by a pump P and is delivered to a component 204 for reducing the dissolved organic compound content. This component 204 can include one or more of an oxidant treatment assembly (as discussed in our earlier patents/applications), treatment with radiation, or a bio-filter. The liquid can then be further treated with ultraviolet radiation as indicated at 206, and then the liquid can be discharged. With such an arrangement, the BOD can be reduced to below 30 ppm, and the TSS can also be further reduced.

Referring now to FIGS. 2A–2C, the filter assembly will now be discussed in further detail. The filter elements 32, 33 are preferably formed of a ceramic composite material, and preferably at least a portion of the filter material is silicon carbide which acts as a lossy to generate heat when subjected to microwave energy. In a presently preferred form, the filters are a reticulated material, formed by initially providing a sponge-like foam material into which the material forming the filter element is poured. Once the filter element material is hardened, the foam material is removed by heat, either in a separate foam removal heating step, or when the filter element is fired. The filter element is then ready to use after firing.

In a particularly preferred form of the invention, the filter elements are dual density filter elements, or in other words, different portions of the filter element will have different porosities. Such a filter element is formed utilizing stacked foams of different densities, so that the resulting filter element will have different porosities or densities. The ceramic material is then poured into the foam, the foam is removed and the ceramic is fired (or the foam is removed upon firing). Thus, a dual density (or, if desired, multiple densities could be provided) filter element is provided, as will be better understood with reference to FIG. 2B.

FIG. 2B shows a cross-section of the filter assembly, with the filter elements shown at 32, 33. As shown in FIG. 2B, an interior portion of the filter elements 32a, 33a (having a depth of, e.g., one-eighth to one-quarter of an inch, or approximately one-sixth to one-third of the overall depth of the filter) is provided, and the interior portion has a higher pore density or, in other words, a smaller pore size, than the remainder of the filter element. The outer portions of the filter elements 32b, 33b will have a lower pore density, or in other words, a larger pore size. The outer portions (which, during a filtering operation, are downstream) of the filter are provided primarily for structural support, and also to provide advantageous air flow during an incineration operation, making the outer portions more desirably constructed with a larger pore size or lower pore density. In addition, by providing a larger pore size, any material which should pass through the inner (or upstream) portions of the filter is less likely to become embedded within the outer portions of the filter, since the outer portions have a larger pore size. As a result, the filter element is less susceptible to clogging deep within the filter element. It is desirable to avoid clogging deep within the filter element, since debris (including products of combustion) embedded deep within the filter can be difficult to clean and remove. The provision of a dual density filter element, particularly one in which the upstream portion of the filter element has a higher pore density and smaller pore size as compared with the downstream portion, provides a number of advantages. With a dual density filter, the interior portions (32a, 33a) of the filter elements have a higher pore density, and thus are more effective in removing particulate material from the liquid. This inner in portion is more readily cleaned during the microwave incineration process utilized in the periodic cleaning of the filter elements since entrapped particles will be at or near the surface of the filter element. Further, debris (either the debris removed from the liquid, or ash debris which is formed during the microwave incineration process) is more readily removed from the inner portions of the filter element by flow provided in the direction opposite to the direction of flow during filtering (i.e., during purging or back flushing). In particular, particles in the inner portion can be removed or dislodged from the filter assembly during the back flushing operation of the upper filter element, and also as air flows toward the interior of the filter assembly through the filter elements during the incinerating operation. Although the interior portion is typically a weaker ceramic material (due to the higher porosity), sufficient structural integrity is provided by the outer portions of the filter elements 32b, 33b. In addition, the outer filter portions provide better drainage and air flow for drying and incineration of the debris within the filter assembly. Thus, the overall construction of the filter elements provides desirable filtration, reverse flow (back flushing or air flow during incineration), structural integrity, clog/debris removal and clog prevention (since the arrangement is less susceptible to debris becoming embedded deeply within the filter element). The lower pore density of the outer portions of the filter also assists in ensuring liquids will drain more completely from the filter element, since the larger pore size is less susceptible to retaining water, e.g., by capillary action. Thus, the dual or multiple filter arrangement as discussed above is advantageous in a number of respects.

By way of example, and not to be construed as limiting, the outer portions 32b, 33b of the filter element can have a porosity of 5–30 pores per inch (ppi), and preferably a porosity of 10–20 ppi. The inner portions of the filter element can have porosities as discussed earlier for the upper and lower filter elements. In particular, the inner or upstream portion of the top filter element can have a porosity of 30–65 ppi, with a range of 40–50 ppi presently preferred, while the bottom filter can have a porosity of approximately 30–65 ppi, with a range of 30–40 ppi presently preferred. As should be apparent from the forgoing ranges, the upper and lower filter elements can have the same porosity, or the bottom filter element can have a porosity lower (i.e., a lower pore density) than that of the top filter element. It is also to be understood that the foregoing ranges are for the filter assembly of the FIG. 1/FIG. 3 arrangement. As discussed earlier, if an additional secondary filter 202 is provided (i.e. as discussed earlier with respect to FIG. 7), the secondary filter will preferably have a higher pore density (smaller pore size).

Although the dual density filter elements shown in FIG. 2B are cup-shaped, one or both of the filter elements could also be shaped differently. For example, a dual density disk-shaped filter element can be formed with a disk portion having a high pore density and another disk portion having a lower pore density.

As shown in FIG. 2B, a window or aperture 37 is provided, through which microwave energy enters the filter assembly for a microwave cleaning/incineration process. As shown in FIG. 2C, a flange 38 is provided (which is omitted from FIG. 2B), upon which a magnetron can be mounted to provide microwave energy through the aperture 37. Of course, other mounting expedients can be provided for the magnetron, or the magnetron can be formed with an integral mount to the filter assembly. The conduit 36 provides an exhaust outlet during the microwave incineration process.

Figure 3:
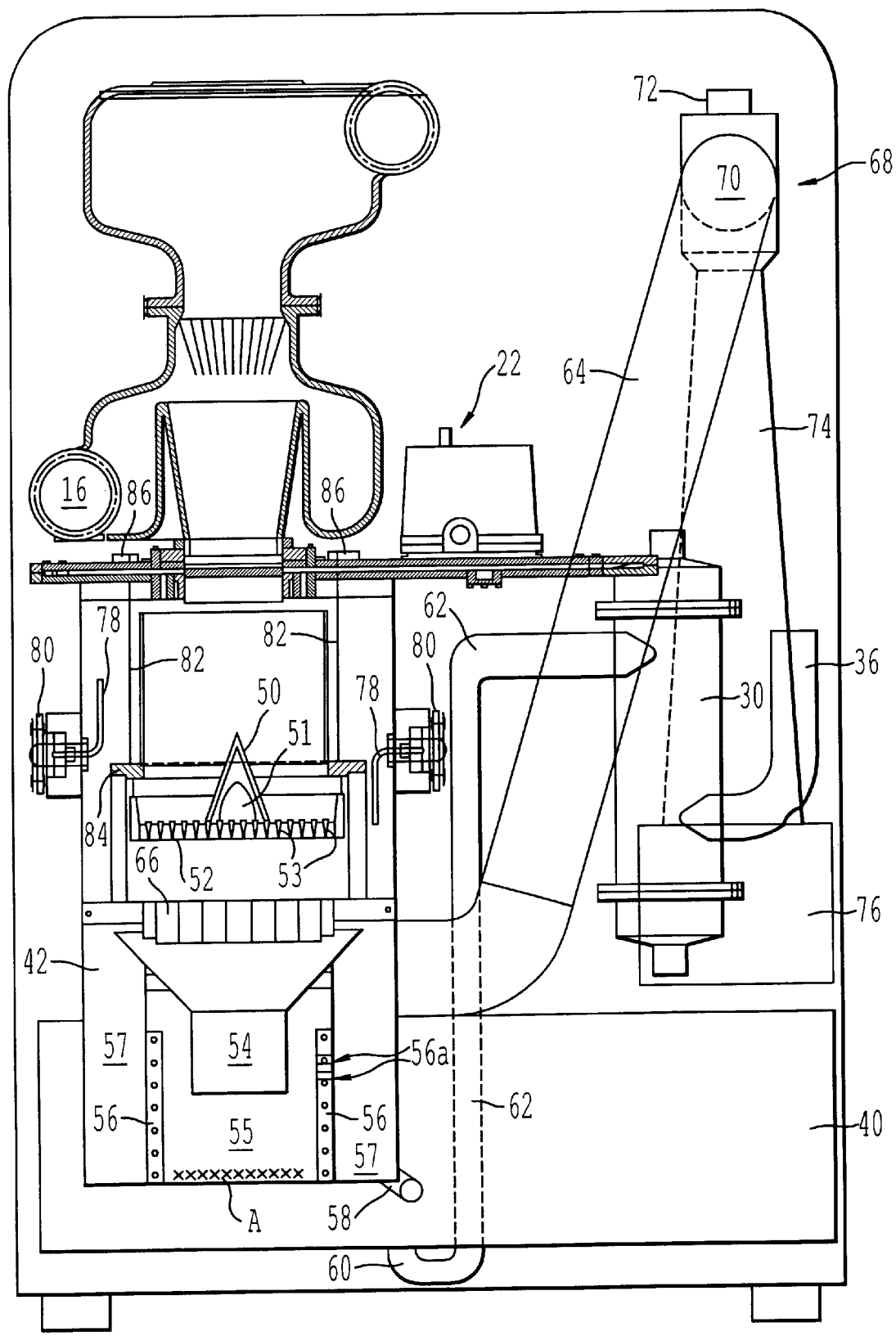
FIG. 3 depicts further details of the system of FIG. 1.

FIG. 3 is an enlarged view of the arrangement of FIG. 1, with additional details provided. As shown in FIG. 3, in a presently preferred form, a conical member 50 having arch-shaped apertures 51 is disposed in the incineration chamber 20, and more particularly, upon the substrate 52 of the incineration chamber. Thus, when the valve 22 is open so that waste can drop into the incineration chamber, it drops upon the conical member 50. The conical member 50 is preferably formed entirely, or at least partially, of a lossy material. Thus, the conical member 50 serves to reduce accumulation of the solid waste material in a centralized location, and assists in distributing the solid waste material as it drops into the incineration chamber. In addition, the lossy material provides additional heating when subjected to microwave energy. Thus, the conical member 50 assists in ensuring more complete combustion of the solid material, since it prevents the accumulation of a large mass of material at a centralized location (which would be difficult to incinerate completely). As disclosed in our earlier patents/applications, the substrate 52 can be formed of a composite ceramic material including a lossy or a lossy coating, and the substrate 52 can be in the form of a honeycomb shaped substrate so that any residual liquids which remain in the solid waste material can drain through the honeycomb apertures. Dispersed throughout the substrate 52 (of FIG. 3) are nail-shaped or projecting members 53, which can also be formed of a ceramic or ceramic/lossy material, and which assist in maintaining portions of the solid waste above the substrate, to prevent matting of the waste upon the substrate and thereby ensure more complete combustion of the solid waste material. The nail-shaped members 53 can be disposed, for example, at the intersections of the honeycombs or, in other words, at corner locations of the honeycomb shapes.

Figure 8A:
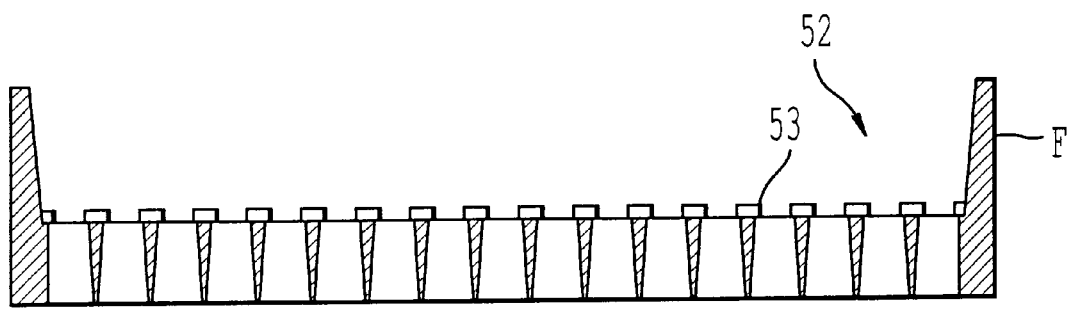
FIGS. 8A–C depict substrates for the incineration assembly of the system shown in FIGS. 1 and 3.
Figure 8B:
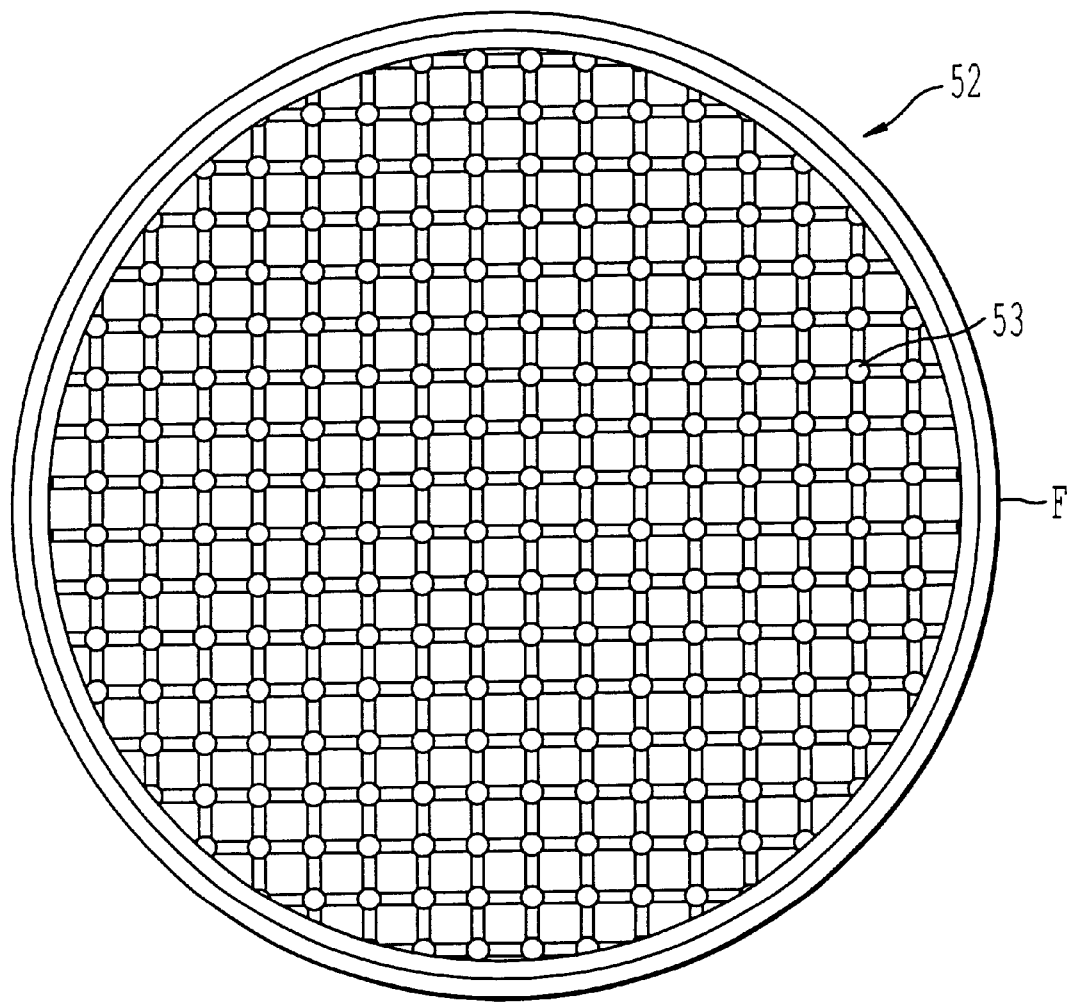
Figure 8C:
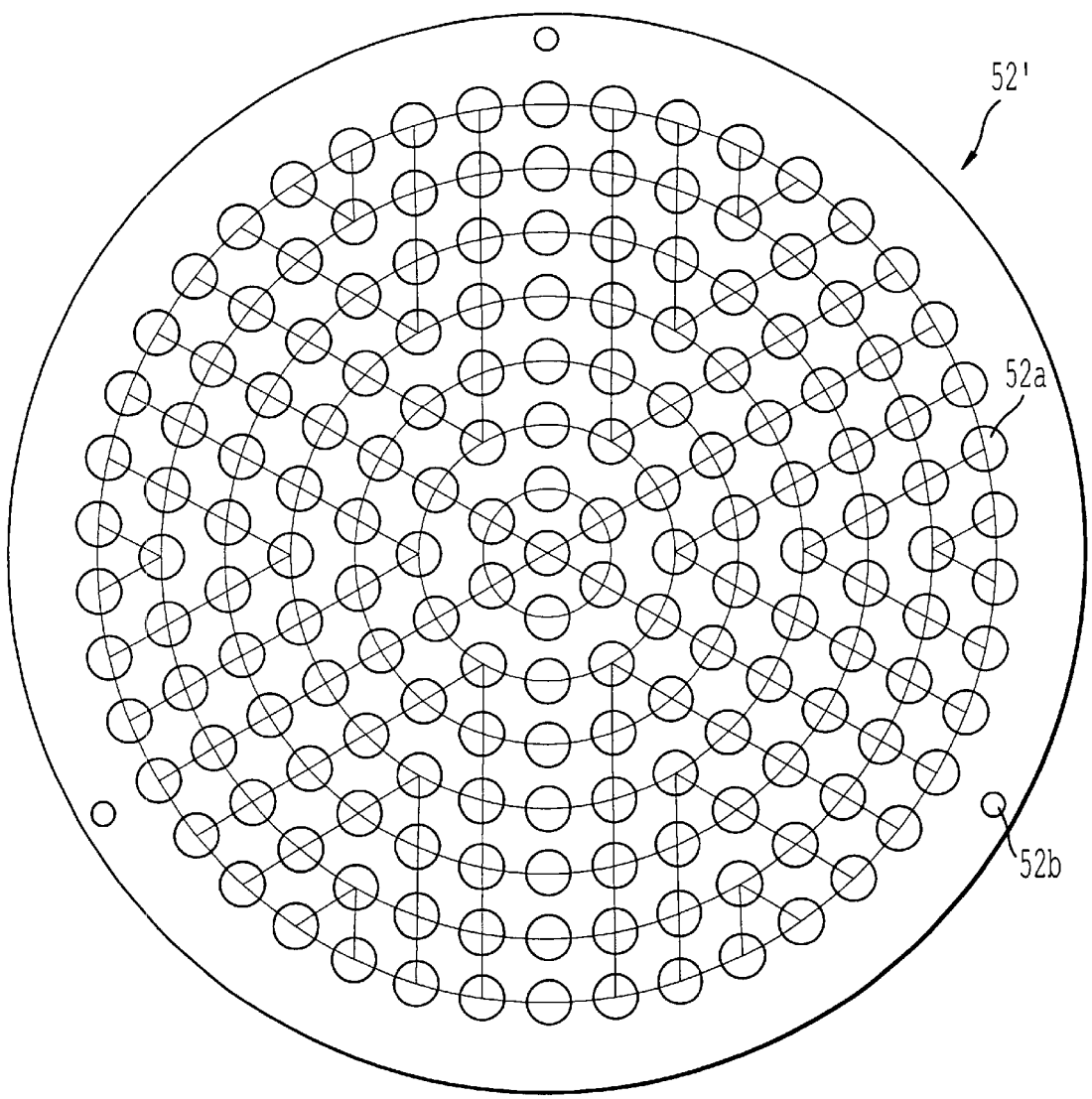

Referring briefly to FIGS. 8A–8C, further details of the substrate for the solid waste incineration assembly are shown. FIGS. 8A and 8B depict, respectively, a side-cross sectional and a plan view of an arrangement as shown in FIG. 3. As discussed earlier, such an arrangement can include a grid or honeycomb pattern (FIG. 8B), in which nail-shaped or projecting portions 53 are provided at the intersections of the pattern. In addition, a flange portion F can be disposed about the periphery of the substrate 52 for mounting of the substrate. The substrate can be of a one-piece molded construction, and can be formed of various materials, or combinations of materials including, for example, corderite, silicon carbide, or mullite, and can also include additional materials for strengthening (e.g., zirconium).

The substrate can be mounted to the sidewall of the incineration chamber at the flange portion F or, as discussed herein, can be suspended with a load cell suspension arrangement. Referring now to FIG. 8C, an alternate embodiment is shown in which a plurality of apertures are provided in the substrate 52'. The arrangement of FIG. 8C can be formed of materials as discussed above with reference to FIGS. 8A–8B. As shown in FIG. 8C, apertures 52a can be formed throughout the substrate 52', and additional apertures 52b can be provided in the periphery of the substrate 52' for receiving the load cell suspension arrangement. It is to be understood that alternate mounting arrangements are also possible. By way of example, and not to be construed as limiting, the apertures of the substrate can be three-eighths to one-quarter of an inch in size, and the overall substrate can have a diameter of approximately 9 inches. Of course, the sizes and dimensions can vary depending on the application and size of the overall system. The concentric circular lines and wedge lines of FIG. 8C are provided only to depict that the apertures 52a are disposed in a regular, symmetrical pattern. However, it is also to be understood that different hole patterns are possible, and the hole pattern or spacing need not be uniform. Preferably, the hole pattern and hole sizes are provided such that the solid waste is retained upon the substrate before and it during incineration. However, as ash is produced during incineration, the ash is allowed to pass through the apertures. The holes are preferably sized and spaced to ensure satisfactory air flow. In addition to lossy materials of which the substrate can be formed, additional lossy materials can be disposed above the substrate, for example, in the form of a cone (as shown at 50 in FIG. 3), a coating disposed on the substrate, or a bed of lossy material (e.g., pebbles of a lossy material), to further assist in providing heat to the solid being incinerated.

Preferably, the holes or apertures 52a of the substrate are formed so that square edges are avoided (i.e., when viewed in cross-section, the edges of the holes will be rounded or radiused), since sharp edges have been found to be less durable from a thermal expansion standpoint.

The liquid which drains through the substrate 52 passes into a sump 42 (FIG. 3), which includes a funnel 54 in order to direct the liquids into a central portion 55 of the sump 42. The central portion is delimited by walls 56 having apertures 56a at upper portions of the walls. With this arrangement, liquids draining from the incineration chamber first enter the central portion 55 of the sump, and as the liquid level rises, the liquid then passes through the apertures 56a into the outer portion 57 of the sump. Any ash residues which drop into the sump are thus confined within the central portion 55 as indicated by the letter "A". Retaining the ash residues A in this central portion is desirable, since they would present an obstruction to liquids from the sump which are then passed to the filter assembly 30. The ash residues A have already been burnt, and thus would typically not benefit from further processing by the filter assembly 30. Since the amount of ash residue A is relatively small, the ash residue can be removed when periodic maintenance is performed. The liquids from the sump 42 can either be drained into the surge tank 40 via pipe 58, or the pipe 58 can be connected to the filter assembly 30 and the liquids can be directly drawn through the filter assembly 30 from the sump.

In order to minimize space, in the arrangement shown in FIG. 3, the sump 42 is partially disposed inside of the surge tank 40, however, other configurations are also possible. The surge tank 40 also receives liquids which exit the liquid outlet 16 of the separator via piping which, for ease of illustration, is not shown in FIG. 3. The bottom of the surge tank 40 can preferably have a contour, inclined or with a slight grating, so that any solids which might accumulate in the surge tank 40 will tend to gravitate toward the outlet 60 of the surge tank 40, so that when liquids are drawn through the conduit 62 to the filter assembly 30, any solids which might settle in the surge tank 40 are drawn with the liquid and forwarded to the filter assembly 30. As also shown in FIG. 3, an exhaust conduit 64 extends from the head space of the sump 42. This conduit draws exhaust gases from the incineration chamber during incineration of the solids in the incineration chamber. (The exhaust gases pass through the bundle of tubes 66 which also form a microwave trap for the incineration chamber, and then to the conduit 64.) The exhaust gases 64 then pass through a wet venturi air scrubber which, in and of itself, is known. However, wet venturi air scrubbers have heretofore not been recognized as advantageous for the exhaust of a waste treatment system. Since wet venturi air scrubbers are known, complete details are not depicted in FIG. 3. Generally, the wet venturi air scrubber 68 includes an inlet 70 which receives exhaust gases from the conduit 64, and a water inlet 72, such that any particulate material which is carried with the exhaust is removed by water passing through the inlet 72, and the water removes the particulate material from the exhaust. The water also provides cooling of the exhaust, so that the exhaust can be safely discharged through the side of a building (i.e., a chimney assembly is not required). The exhaust and water then fall through a conduit 74, and pass into a collection box 76. The collection box has an exhaust outlet (not shown) through which the exhaust gas can exit the system, after the particulate material is removed therefrom. In addition, a liquid outlet and recirculating pump (not shown) are provided so that the liquid which is collected in the box 76 is recirculated to the top of the air scrubber 68 to continue removing particulates from the exhaust. Periodically, e.g., daily, the water of the venturi air scrubber 68 is replaced, thereby removing the particulate debris retained with the used liquid.

The wet venturi air scrubber is particularly beneficial in cooling exhaust gases. However, its ability to reduce odors has been somewhat limited, unless fresh water is circulated on a regular basis. Accordingly, it can be desirable to additionally provide an additional filter such as a carbon filter for exhaust gases downstream of the venturi air scrubber. Further, where cooling of exhaust gases are not a concern, an alternate exhaust filter such as a carbon filter can be utilized in lieu of the wet venturi scrubber.

Additional advantageous aspects of the incineration chamber are also shown in FIG. 3. In particular, as shown, the antennae 78, which supply microwave energy into the incineration chamber are rotatably mounted, to provide a stirring action of the microwave energy, and thereby assist in more complete combustion. A suitable drive, e.g., gears 80 connected to a motor/driving train (not shown), is provided for rotating the antennae 78.

In a presently preferred form, the incineration cycle is initiated when a desired amount of solid waste has accumulated upon the substrate 52. FIG. 3 provides an example of an arrangement suitable for detecting the amount of solid waste accumulated upon the substrate 52. In particular, cables 82 extend through a top support structure 84 of the incineration chamber, so that the substrate 52 is suspended by the cables 82. The cables 82, in turn, are connected to strain gauge devices 86, so that the accumulated mass upon the substrate 52 can be determined and, when a sufficient amount of solids have accumulated upon the substrate 52, the valve 22 is closed, and the incineration process can commence.

Instead of load sensors, an event counter arrangement can be utilized so that an incineration cycle is initiated after a predetermined number of events (with each event corresponding to the passage of a quantity of waste). The event sensor can include a light source and a light sensor disposed adjacent to a pipe in the system so that each time a quantity of waste passes the light beam is broken and an event is counted. The event counter has proven accurate (with approximately the same accuracy as load cell arrangements) for purposes of initiating the incineration cycle, and is currently less expensive than load cell arrangements.

Figure 4C:
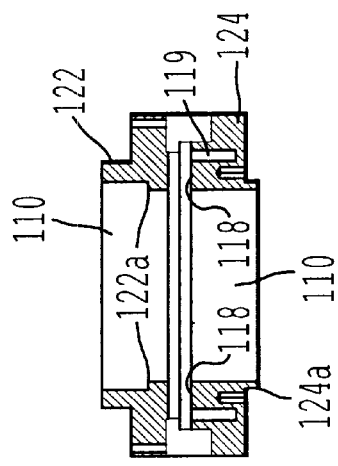
FIGS. 4A–4C depict plan and cross-sectional views of a valve assembly which separates the incinerator and separator.
Figure 4B:
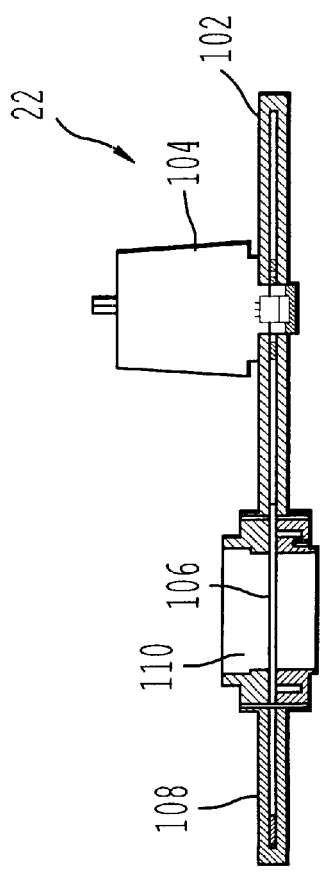
Figure 4A:
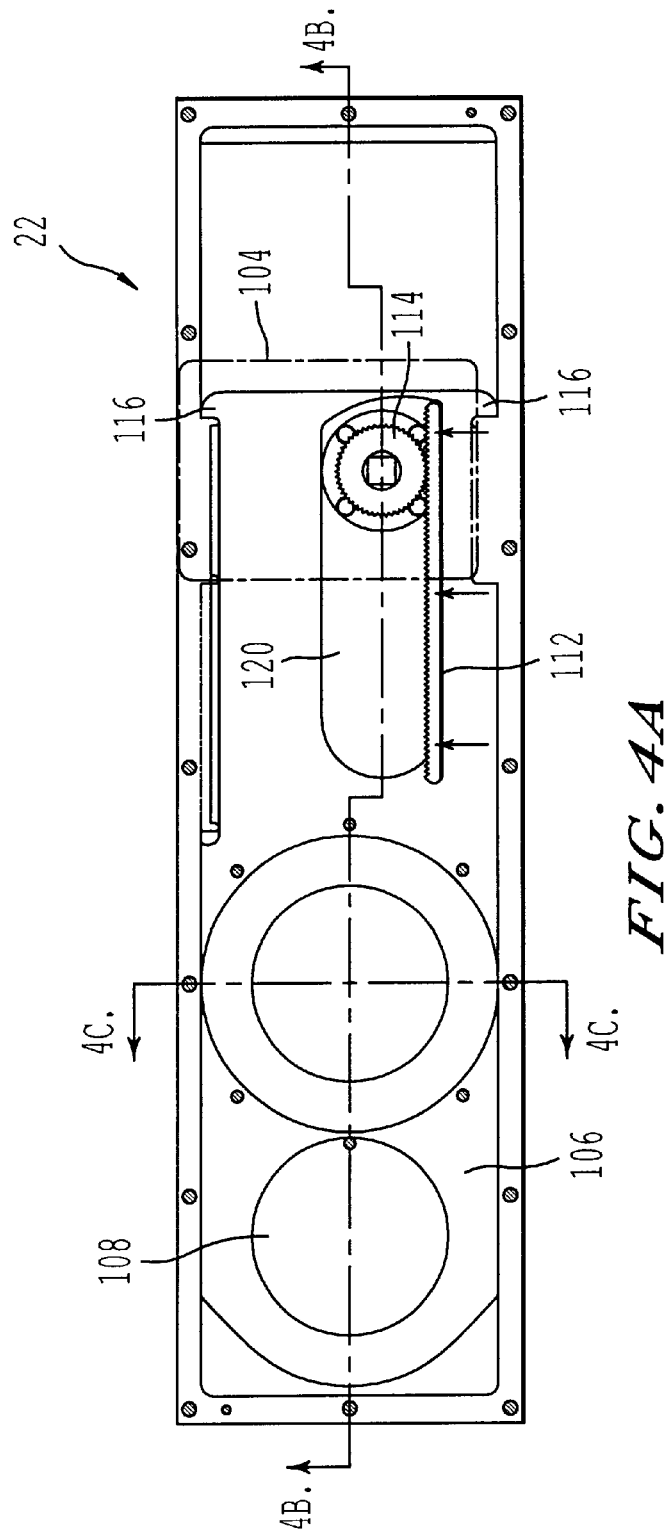

FIGS. 4A–4C depict additional details regarding the valve assembly. As mentioned earlier, the valve assembly advantageously separates the separator from the microwave incineration chamber, not only from a flow standpoint, but also in delimiting the microwave cavity (and acting as a microwave trap) during an incineration process. In addition, the valve assembly should prevent the escape of exhaust gases from the incineration assembly.

FIG. 4A is a plan view of valve the components, while FIG. 4B is a cross-sectional view along line IVB—IVB of FIG. 4A, and FIG. 4C is a cross-sectional view along lines IVC—IVC of FIG. 4A. In FIG. 4A, the top cover 102 of the valve assembly is removed, and the actuator 104 is shown in broken line, so that additional details can be seen. The valve assembly 22 includes a knife or gate type closure member 106. In FIGS. 4A and 4B, the valve closure member 106 is in the closed position, and has an opening 108 which is disposed to the left of the passageway 110 through the valve. This closed position is utilized during incineration. When the valve closure member 106 is moved to the right, the opening 108 of the closure member 106 becomes aligned with the valve passageway 110, so that solids can pass from the separator to the incineration cavity. As shown in FIG. 4A, a toothed rack 112 is disposed on the valve closure member 106, and the rack meshes with a pinion 114.

The closure member 106 also has an aperture 120 extending therethrough, so that the pinion 114 can extend into the aperture for meshing with the rack 112. In addition, flanges 118 can be provided at the end of the closure member 106 to assist in guiding (and resist skewing of) the closure member 106 during movement. In the form shown in FIG. 4B, a motor 104 is provided for rotating the pinion 114, to thereby control movement of the closure member 106. It is to be understood that various types of actuators and couplings between the actuator and the closure member are possible in lieu of the motorized rack and pinion arrangement shown in FIGS. 4A and 4B.

As shown in FIG. 4C, a slot 118 is provided within the valve assembly in which the closure member 106 is guided during movement between the opened and closed positions. As also shown in FIG. 4C, upper and lower flanges 122, 124 are provided, which define the valve passageway 110, and which provide for suitable mounting and connection of the valve to the separator and incineration assemblies. By way of example, a pipe extending from the separator can fit inside of the upper flange 122, and sit upon the shoulder 122a provided inside of the upper flange. In addition, an exterior shoulder 124a can sit inside of a pipe or opening which extends into the incineration assembly.

As also shown in FIG. 4C, a slot 119 extends around the lower flange. This slot 119 can be circular or formed of two semicircular portions (or other fractions of a circle). This slot advantageous in a number of respects. First, the slot forms a microwave trap, to ensure that microwaves do not escape past the valve assembly. For this reason, the slot (or grooved portion) is provided at a location spaced by a distance of one-quarter of a wavelength of the radiation utilized for incineration, radially outside from the aperture which defines the valve passageway 110. More particularly, a one-quarter wavelength spacing is provided between the valve passageway 110 (the inner surface of the flange 124) to the slot 119. The slot can be filled with a material such as Teflon, which provides a desirable surface upon which the closure member 106 slides during movement. In addition, the Teflon material can assist in providing a wiping action of the closure member so that debris, to which the closure member can be exposed, is wiped from the closure member and does not result in sticking of the closure member or other deterioration in the performance of the valve assembly. It is to be understood that other seal/wiping expedients can be utilized as an alternative to Teflon, particularly if the system is to be utilized extensively, since Teflon can degrade or be subject to wear.

Figure 4F:
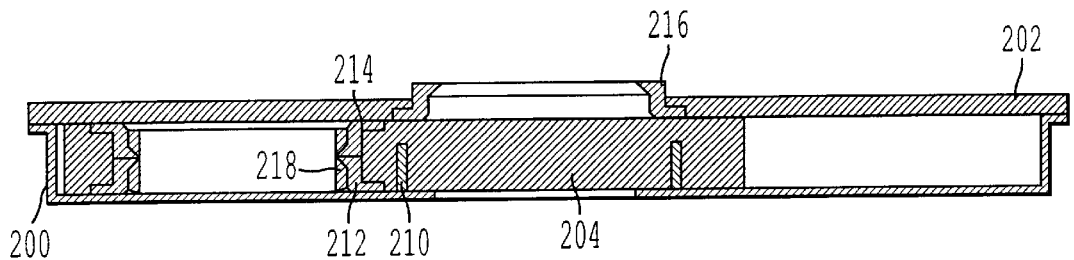
FIGS. 4D–4F are cross-sectional views of an alternate valve assembly embodiment.
Figure 4E:
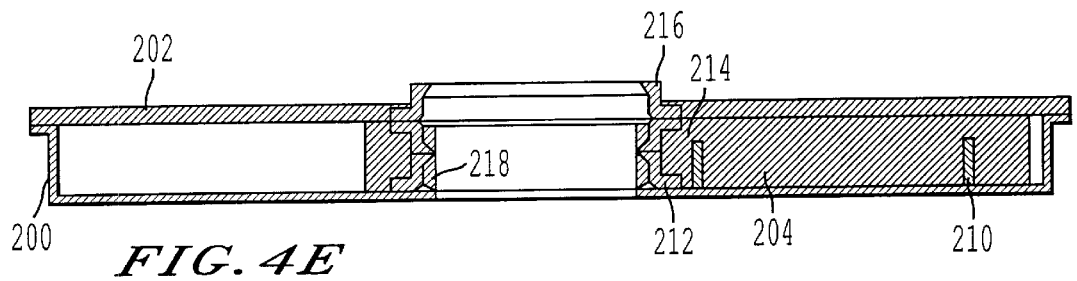
Figure 4D:
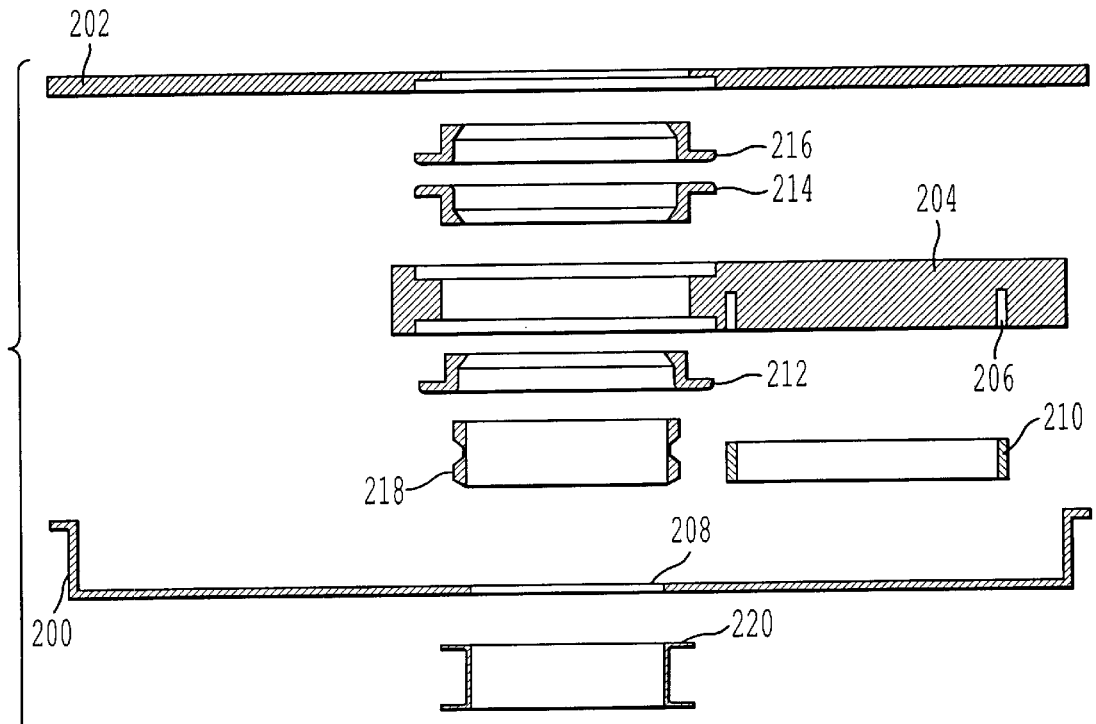

FIGS. 4D–4F depict an alternate embodiment for the valve assembly. The arrangement of FIGS. 4D–4F is believed to be somewhat simpler in design, manufacture, and installation as compared with the arrangement of FIGS. 4A–4C, while nevertheless providing the isolation functions of the arrangement of FIGS. 4A–4C. As shown in the exploded view of FIG. 4D, the arrangement includes a tray or valve body which can be formed, for example, of stainless. This tray together with the cover 202 form the housing or enclosure for the valve.

The closure member for the valve is a knife or gate-type closure member 204, and is movable between an open position (shown in FIG. 4E) and a closed position (shown in FIG. 4F). The closure member 204 can be formed, for example, of a metal, such as stainless, and can have a non-stick coating such as a Teflon coating. In contrast to the arrangement of FIGS. 4A–4C, with the alternate embodiment, the slot forming the microwave trap is provided in the closure member 204. This slot is shown at 205, and is in the form of a circular groove 206, such that the microwave trap is disposed about the opening 208 of the tray 200 when the valve is in the closed position as shown in FIG. 4F. Although the groove or slot 206 is in the form of a continuous circular groove, it is to be understood that alternate shapes are possible, for example, a pair of semicircular portions or other fractions of the circle as discussed earlier. When the valve is closed, the groove (or grooved portion) is provided at a location spaced radially outside from the flow passage by a distance of one-fourth of a microwave wavelength. Preferably, a plug is inserted into the microwave trap, such as a Teflon plug 210. The Teflon plug provides a good bearing surface or sliding surface between the bottom of the closure member 204 and the tray 200. In addition, the plug 210 prevents debris from collecting within the groove 206. It is also preferable to provide Teflon slide plates on the side surfaces of the closure member (and optionally on the top of the closure member) to provide good sliding movement between the side surfaces of the closure member and the interior side surfaces of the tray 200. The arrangement further includes three seals, however it is to be understood that a smaller or greater number of seals could be provided depending upon the particular design or manufacturing selection. For example, rather than having two seals 212, 214 for the closure member 204, a single seal could be provided, which is deformed to insert same through the aperture of the closure member 204 or, alternately, more than two seals could be utilized. In the arrangement of FIGS. 4D–4F, the seals 212, 214 provide a seal for the aperture of the closure member 204, while the third seal 216 forms a seal for the aperture of the cover plate 202. The seal 216 also provides a fixture which will receive the solid outlet (or a PVC extension coupled to the solid outlet) of the separator. The seal 216 is formed of a hard rubber or elastomer material (as are the seals 214, 216) so that when a pipe is inserted into the top of the seal 216 the seal deforms slightly and forms a tight seal about the pipe. The solid outlet/outlet extension pipe further provides support for the seal once disposed inside of the seal. The seals 214, 216 are held in place by a necked portion 218 which is shaped such that it will hold the seals 214, 216 in place once inserted into the opening of the closure member 204 as shown in the assembled view of FIGS. 4E and 4F. The necked portion 218 can be formed, for example, of PVC or another suitable material. The seals 212, 214 and 216 also provide good bearing surfaces in the sliding movement of the closure member 204. Preferably, the seals are formed of a hard rubber or elastomer having good wear resistance, for example, a rubber or elastomer having a 40–80 derometer hardness. Suitable materials can include, for example, EDPM, Viton or Buna.

A collar connection 220 is fastened to the bottom of the tray 200 to provide a suitable connection location between the lower portion of the valve and the component downstream of the valve, such as the fire tube or incineration arrangement. The collar 220 can be connected to the tray 200 by, for example, welding or brazing or another suitable fastening arrangement. The collar can further be bolted or otherwise fastened to the downstream component.

Various actuator or moving expedients can be utilized for moving the closure member 204, such as a rack and pinion arrangement as described with reference to FIGS. 4A–4C. Alternately, an electric motor and screw, a hydraulic actuator, or other actuation expedients could be utilized.

The arrangement of FIGS. 4D–4F is advantageous in a number of respects. First, the arrangement is believed to be simpler and more reliable as compared with the arrangement of FIGS. 4A–4C. Also, the relatively large external collars of FIGS. 4A–4C are not needed, and the solid outlet/outlet extension pipe is received by the seal 216 to form a good, tightly sealed joint.

FIGS. 5A–5G depict a piping and valving assembly for the various modes of operation of the filter assembly 30. It is to be understood that the arrangement of FIGS. 5A–5G is provided as an example, since certain components are optional and the particular piping and valving configuration can be varied. In addition, it is to be understood that each of the modes of operation depicted in FIGS. 5A–5G is not needed, and certain modes of operation can be eliminated and/or varied, as will be apparent from the discussion which follows.

Figure 5A:
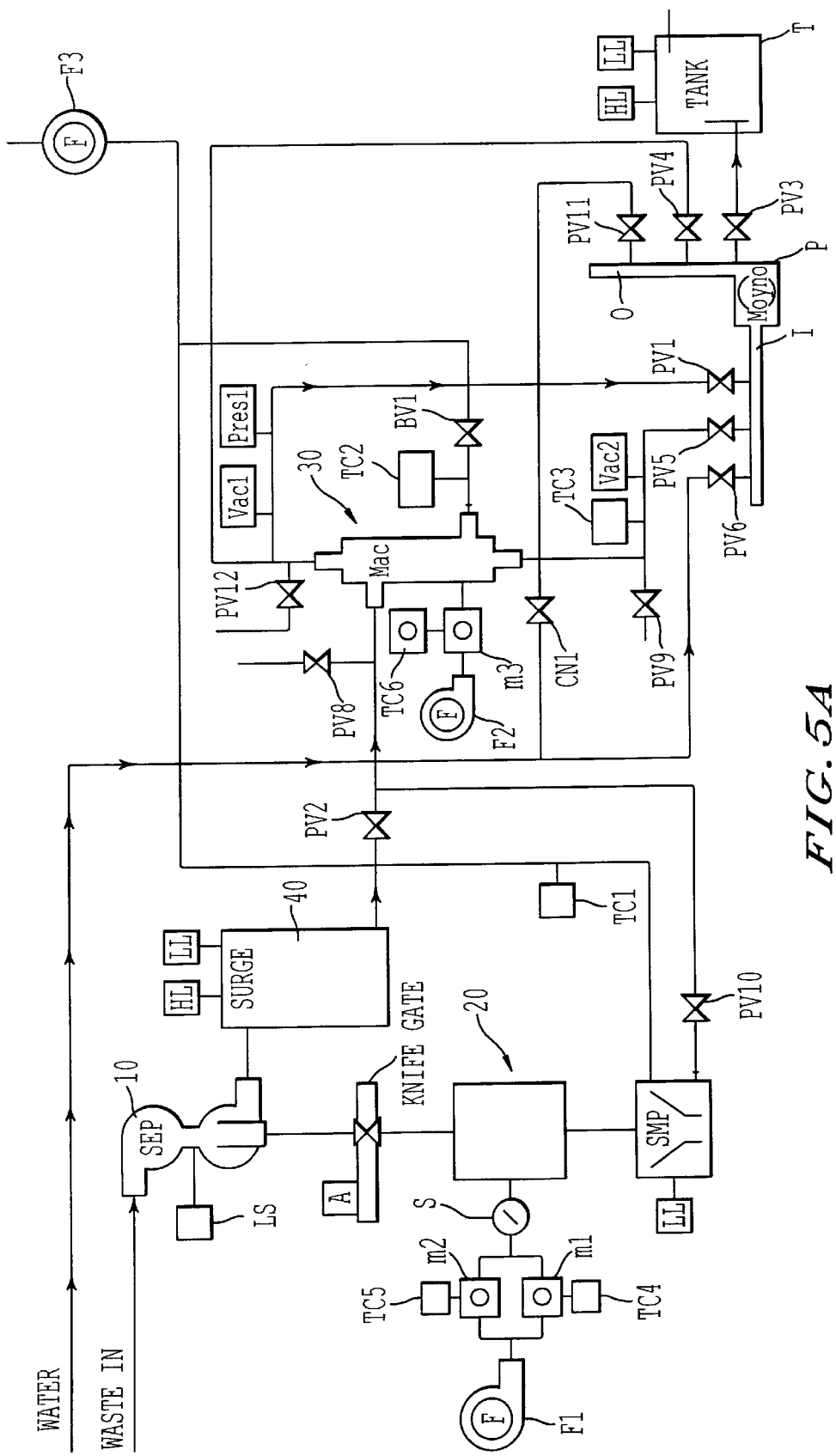
FIGS. 5A–5G depict the various piping and valving connections of an exemplary system of the invention, and various modes of operation.

As shown in FIG. 5A, the system includes various valves indicated with a prefix "PV" since, in the current form, most of the valves are pinch valves. However, it is to be understood that other types of valves may also be utilized. In addition, a ball valve (BV1) is provided for the exhaust exiting the filter assembly. Further, a surge tank 40 is provided, with high level (HL) and low level (LL) sensors, which can be utilized for starting and stopping the flow of liquid from the surge tank to the filter assembly. Optionally, a tank T can be provided to receive the final effluent. However, the tank T is presently utilized for collecting liquids so that the quality of such liquids can be analyzed. For residential or other uses, the tank T can be eliminated, and the final effluent can be discharged into a leaching field, public waterways, sewers, etc.

The system also includes various thermocouples (designated with the prefix TC), including a thermocouple TC1 measuring the temperature of the exhaust air from the incinerator 20 (as discussed earlier, the exhaust is actually removed from the head space of the sump, so that the exhaust gas is drawn downwardly from the incineration chamber 20 toward the sump, and then is exhausted). In addition, a thermocouple TC2 measures the temperature of the exhaust exiting the filter assembly 30. The thermocouples TC1, TC2 can be utilized to determine the time at which it is appropriate to change incineration cycles. For example, an incineration cycle can include a dehydration cycle, followed by a start burn cycle, a combustion cycle, and a cool down cycle. These cycles can be timed, but also one or more cycles can be started and/or stopped utilizing information from thermocouples. The thermocouple TC3 can be provided as an optional additional monitoring thermocouple, but is not needed in monitoring or controlling the system. The thermocouples TC4–TC6 are associated with the various magnetrons M1–M3, to control operation of the magnetrons, as is known to those skilled in the art. In the arrangement of FIGS. 5A–G, two magnetrons (M1, M2) are provided for the solids incineration assembly, and one (M3) is provided for the filter assembly. However, alternate arrangements are also possible. Fans F1 and F2 are provided for cooling the magnetrons, and an exhaust fan F3 is provided for removing exhaust gases from the system.

The arrangement represented at S, adjacent to the incineration chamber 20, represents a stirrer, for the microwave antennas as discussed earlier. The valve CN1 is an optional valve, and as shown, is connected to the water source. The valve CN1 is provided since, in certain applications and operations, it may be of assistance in pulsing water through the pipe which extends past (and which is in communication with) the lower end of the filter assembly, to assist in creating a draw through the lower end of the filter assembly (e.g., during an incineration cycle or a dehydration cycle, or when liquids are being drawn through the lower end of the macro filter). However, the valve CN1 can be eliminated.

The arrangement of FIGS. 5A–5G is advantageous in that only a single pump is needed for the various operations. The pump P can be, for example, a moyno pump. As shown, various connections are provided for the pump. In the arrangement shown in FIG. 5A, the inputs to the pump are provided on the I side of the pump, while the outlets (fluid being pumped away from the pump P) are provided on the O side.

With the foregoing in mind, various operational modes of the filter assembly will now be described. FIG. 5A represents a "fill top filter" mode, and represents the system operation when filtering of a liquid from the surge tank initially commences. The flows designated by arrows in FIG. 5A during this operation are all liquid flows. As shown, there is an additional water inlet flow going to the moyno pump P via valve PV6. This flow is provided for priming the pump P. After flow is established through the filter assembly (e.g., after a 20 second interval), the water flow through PV6 can be discontinued by closing PV6, and the flow being filtered can continue from the surge tank, through the filter assembly, then through the pump P, and to the discharge. This flow can be established by opening valves PV2, PV1, PV3 and PV6, and then closing PV6 after the flow is established.

Figure 5B:
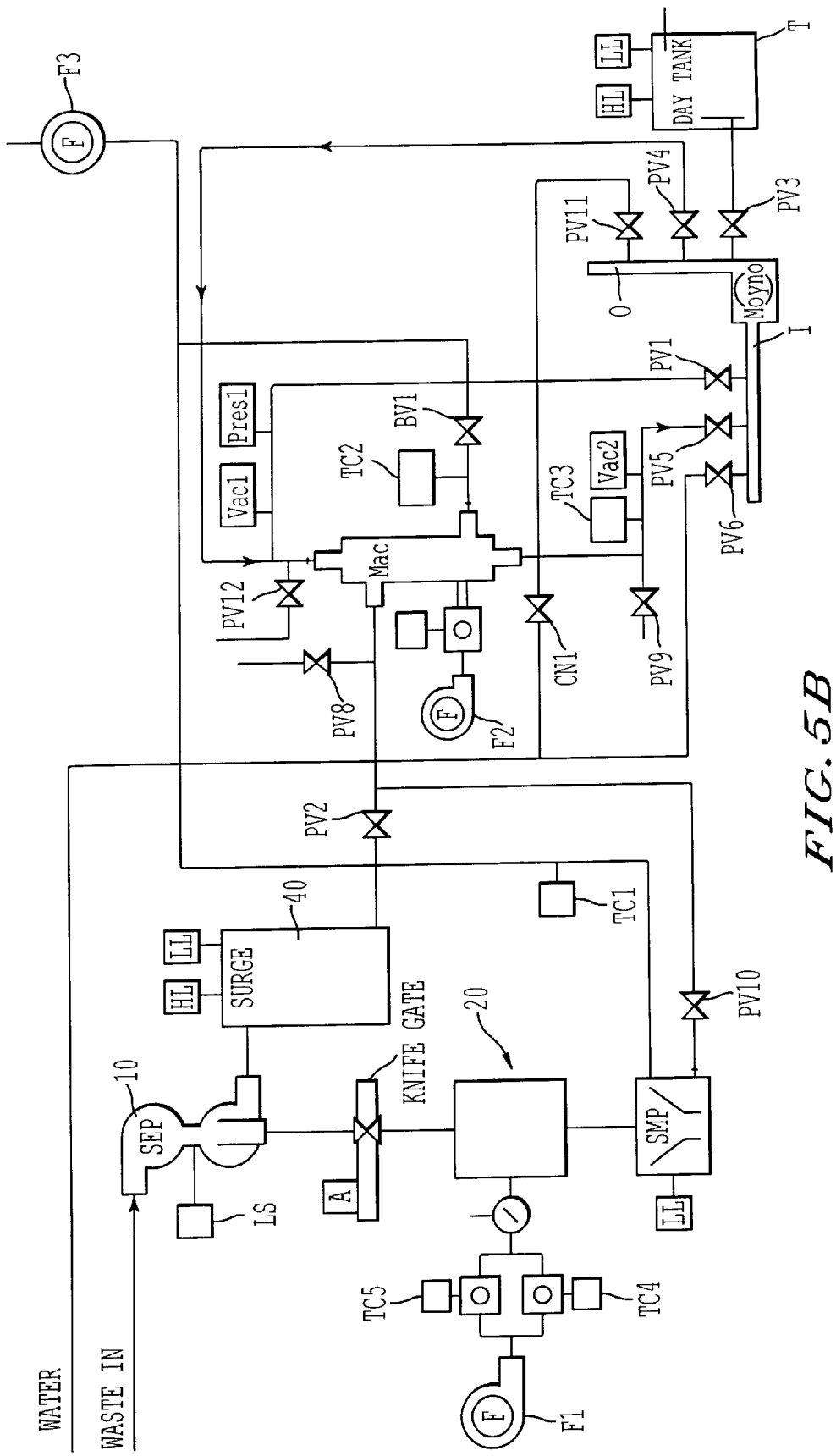

As liquids are filtered through the upper filter of the filter assembly, the filter will become clogged (or partially obstructed), and the pressure drop across the filter will increase. After the pressure drop has increased by a predetermined amount, the vacuum switch Vac1 will be activated, indicating that a filter purging or back flushing operation should occur. The vacuum switch Vacd can also be utilized to determine when an incineration cleaning operation is to be performed, for example, after five instances in which the vacuum switch Vac1 has been tripped. The purging or back flushing operation is represented in FIG. 5B. During this operation, liquids are drawn through the lower filter of the filter assembly, through valve PV5, and the liquids are pumped from the pump P back through the top of the filter assembly via valve PV4. Optionally, during this operation, valve PV3 can be opened, to prevent excessive pressures entering through the top of the filter assembly, which could cause breakage of the filter element. As shown in the drawings, a pressure switch or pressure sensor Pres1 can also optionally be provided, to determine when excessive pressures are present, so that a microwave cleaning operation can be effected and so that high pressure flows which could break the filter elements can be prevented. Again, since the filter elements are ceramic in a present form of the invention, excessive pressures could result in breakage. The pressure switch can provide a signal to, for example, open valve PV3 during purging to decrease the pressure in the purging/back flushing liquid. Alternately, if pressures are excessive, the flow can be discontinued until a microwave cleaning operation has been performed.

As discussed earlier, during this purging operation, material which tends to clog the upper filter assembly is loosened or removed, as the flow is reversed. After a predetermined number of purging/back flushing operations, and/or when the pressure sensed by pressure switch/sensor Pres1 becomes excessive, a microwave incineration cycle is commenced.

Figure 5C:
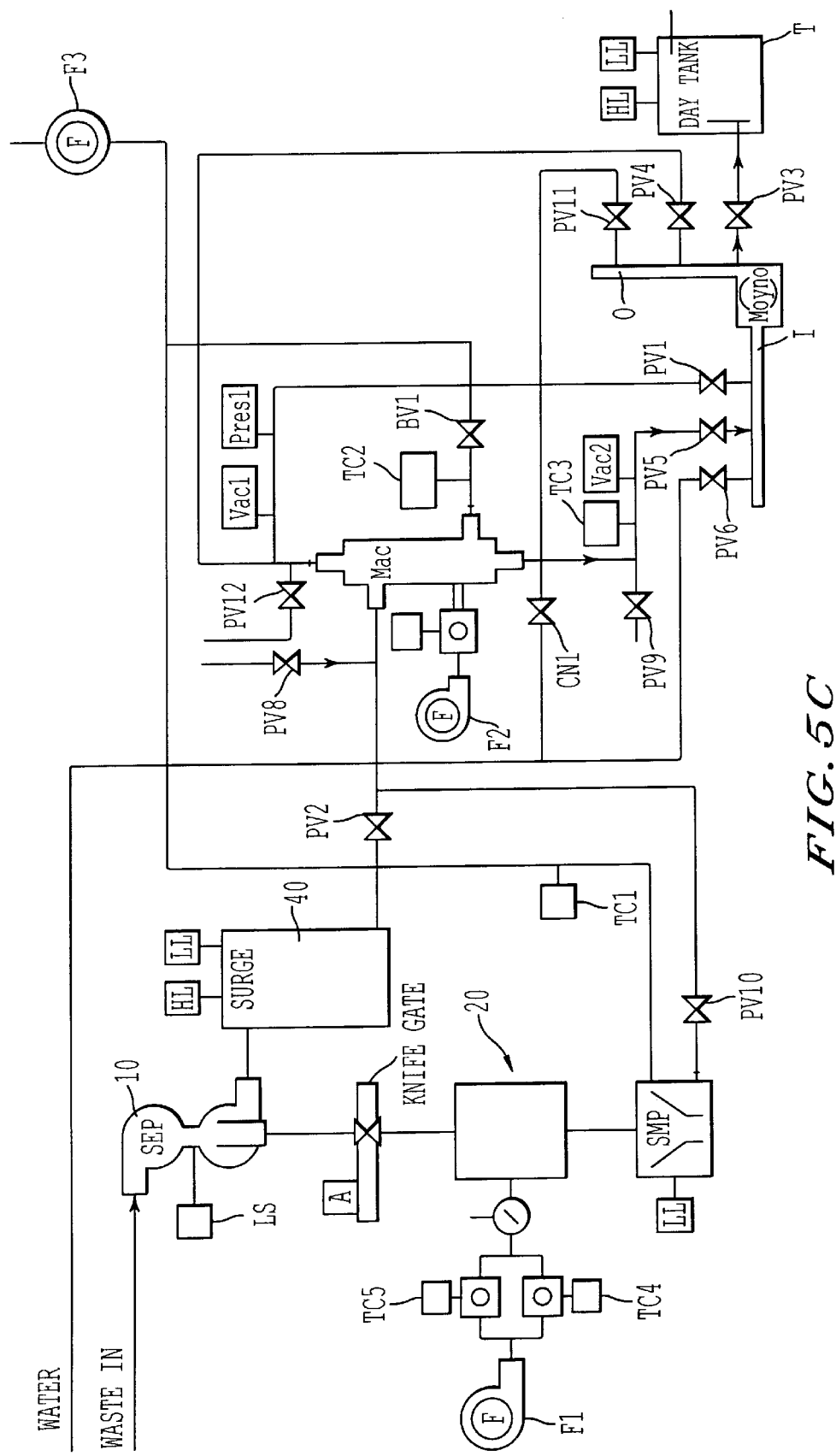

FIG. 5C depicts a draining cycle which can be used in preparation for the microwave incineration. The draining cycle can also be utilized whenever the system is about to become inactive. In particular, after draining the system, the pinch valves can be relaxed, to thereby prolong the life of the valves. In the draining operation of FIG. 5C, liquids are drawn through valve PV5 utilizing the pump P, and the liquids are fed, via valve PV3, out of the system. During this operation, valves PV8 and PV12 can be opened, so that air is drawn into the filter assembly as the liquids are drained. The draining operation can be performed for a predetermined period of time (e.g. 60 seconds) or until the pressure (e.g., as determined by vacuum switch Vac2) decreases to a predetermined value (e.g., 0 psi).

Figure 5D:
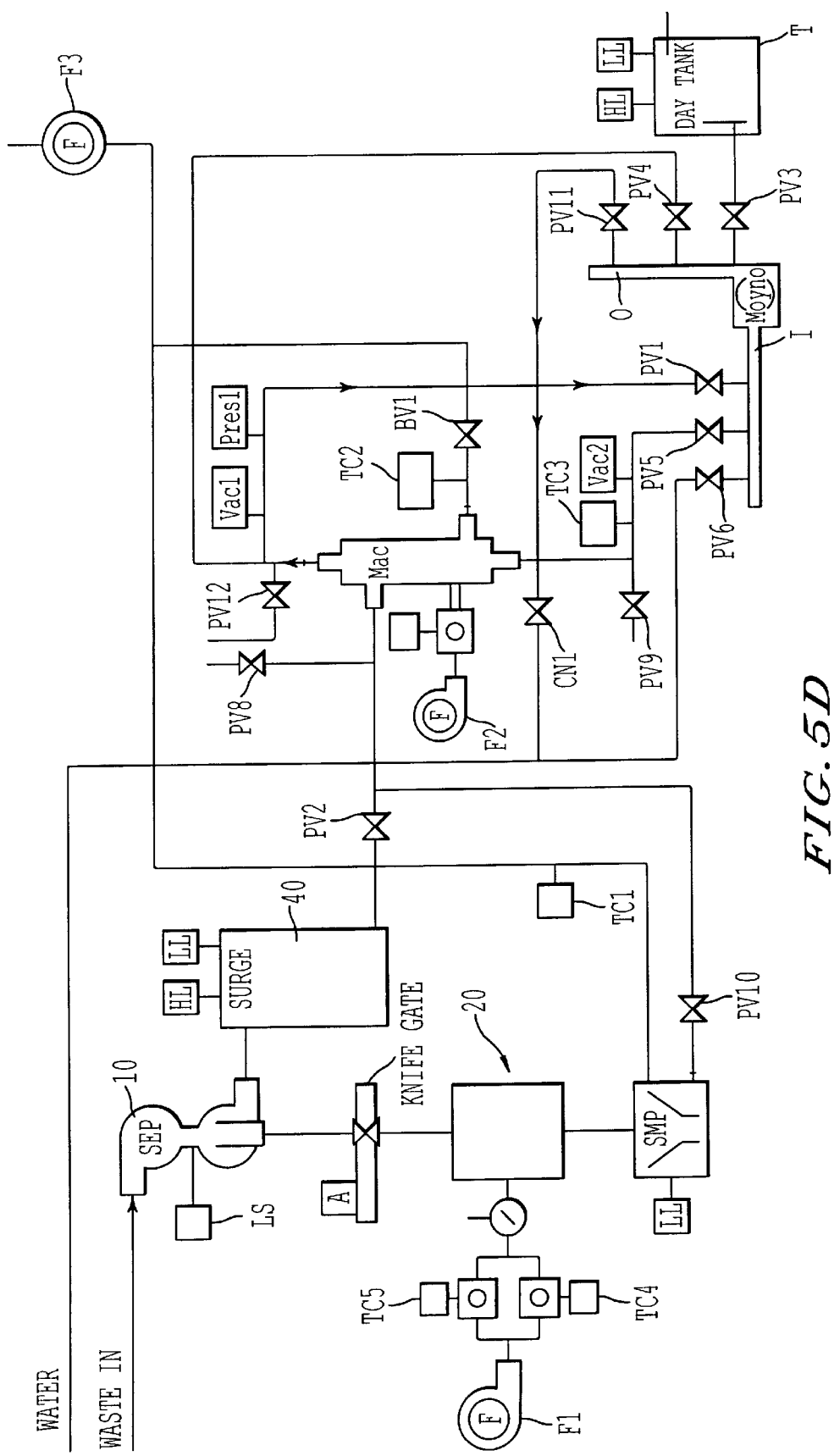

An optional purging or dislodging operation for the bottom filter can also be performed as shown in FIG. 5D. During this dislodging operation, liquid is pumped through the valve PV11 and to the bottom of the filter assembly. The liquid exits the top of the filter assembly and is returned to the pump via valve PV1.

Figure 5E:
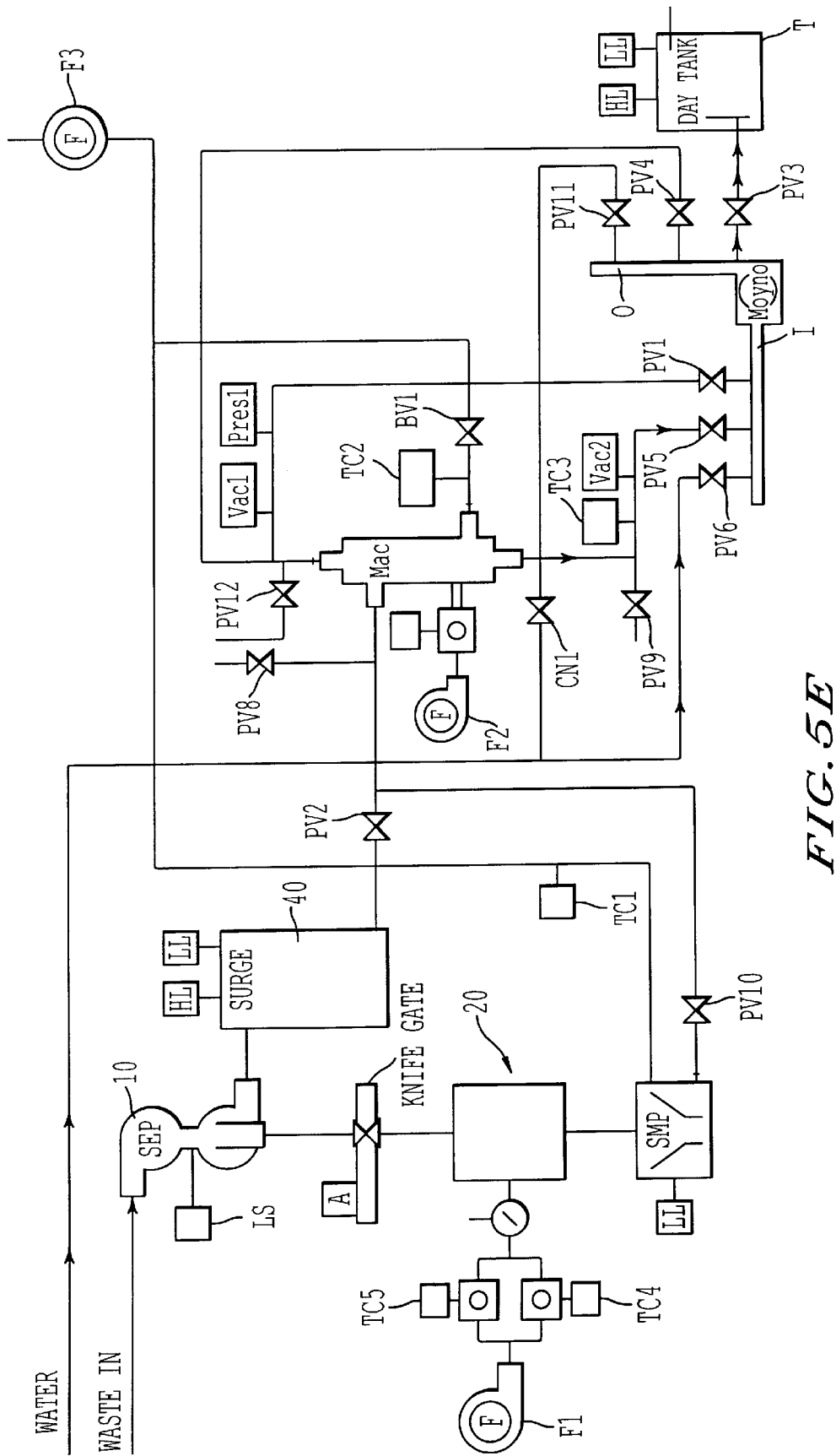

As discussed earlier, the incineration cleaning operation can be performed, e.g., after every five purging operations of the top filter, and/or on a timed basis. In preparation for an incineration operation, a dehydration operation is performed. This dehydration operation is shown in FIG. 5E. As shown, the pump P is utilized to draw any remaining liquids from the filter assembly. Since the amount of liquid in the filter assembly will typically be small, additional household water is fed to the pump through valve PV6, to ensure that liquid is passing through the pump. As mentioned earlier, optionally, household water can pass through the valve CN1, so that the liquid is fed (either continuously or on a pulsing basis), past the outlet of the filter assembly to assist in drawing liquids from the filter assembly. This flow of liquid can assist in creating a vacuum in the filter assembly, which further assists in vaporizing/dehydrating and removing liquids from the filter assembly. During this operation, the magnetron M3 and associated fan F2 are operating to further assist in heating and dehydrating the filter assembly. This dehydration process can occur for a predetermined period of time, or can be discontinued once the thermocouple TC2 determines that a sufficient temperature rise has occurred (the ball valve BV1 is preferably closed during this operation).

Figure 5F:
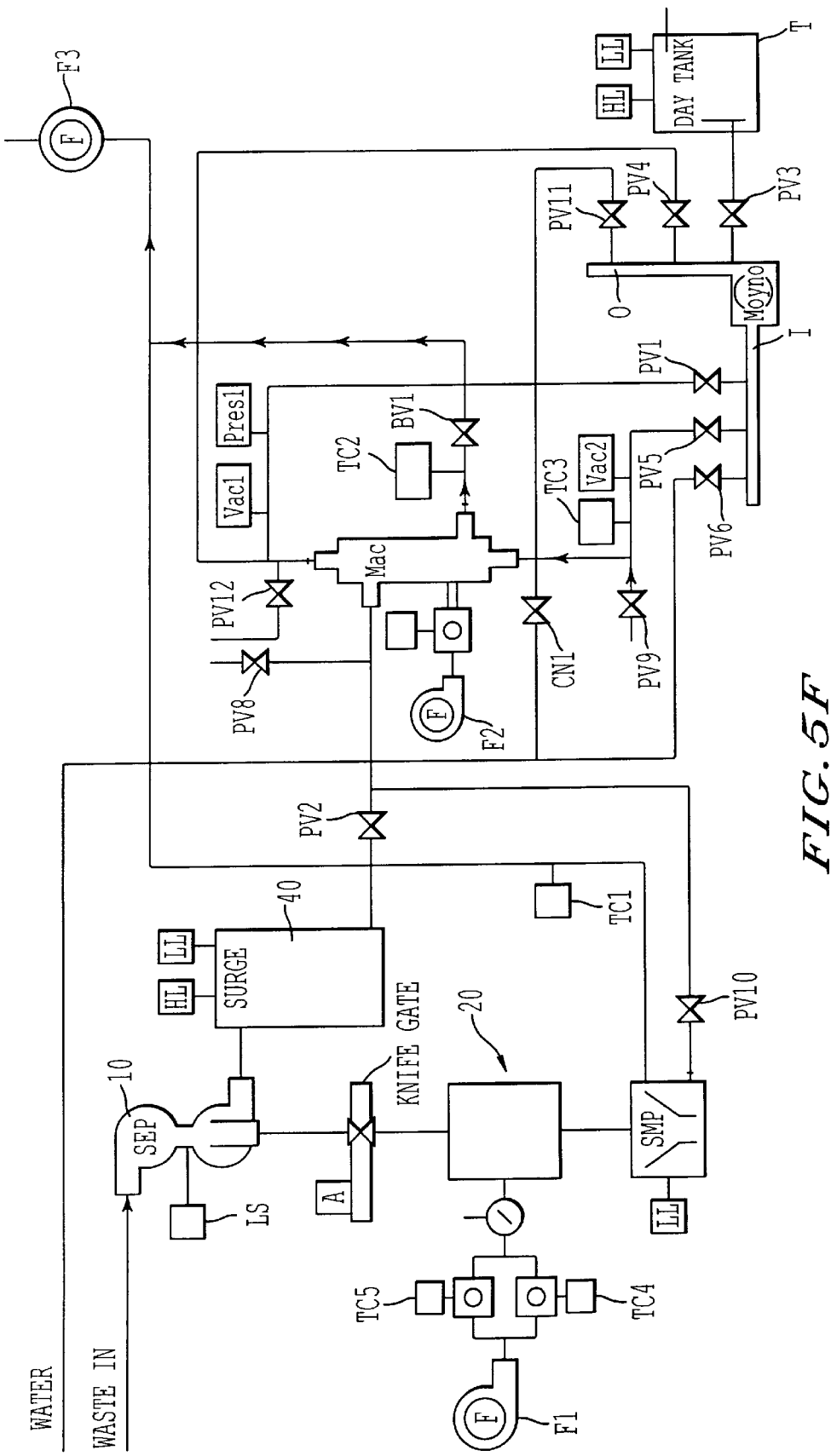
Figure 5G:
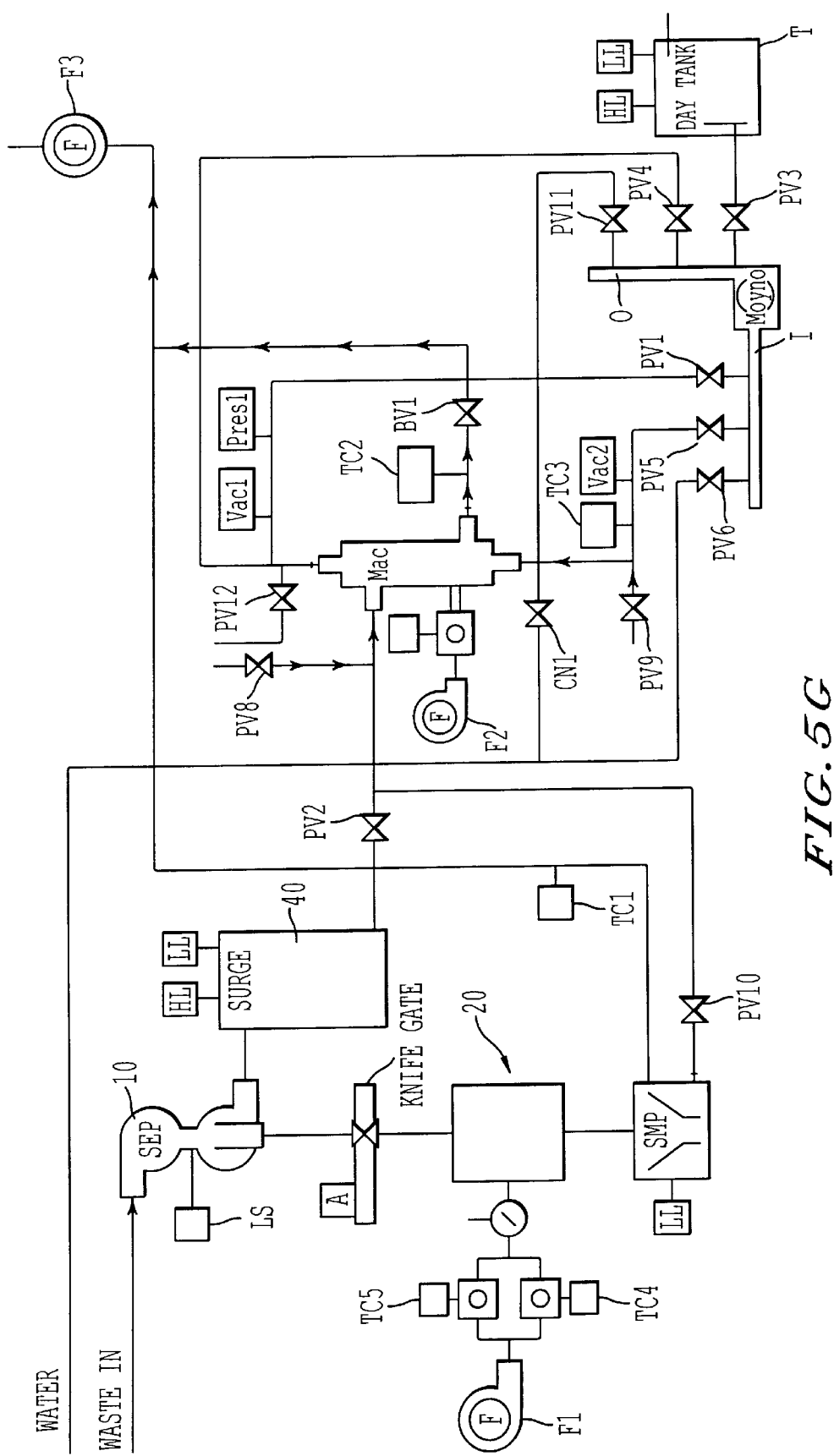

After dehydration, a start burn cycle commences as shown in FIG. 5F. In the start burn cycle, the magnetron M3 continues operation as does fan F2. In addition, the valve BV1 is opened, and the fan F3 is turned on. Further, the valve PV9 is opened, so that air enters through the bottom of the filter assembly. During this start burn operation, the temperature within the filter assembly is increasing, to assist in initiating combustion. The input air flow is not as great as during the combustion cycle. As a result, the temperature rises, so that the waste material will combust readily, except that it is starved for air. The start burn operation can proceed for a period of three minutes (for example), at which time the valve PV8 is opened (to draw in ambient air), so that the combustion cycle commences as shown in FIG. 5G. During the combustion cycle, the valve PV12 can also be opened to draw in additional ambient air for combustion. The combustion cycle can proceed for a predetermined period of time, for example, 10 minutes, and is followed by a cool down cycle. During the cool down, the same valves are open as during the combustion cycle, and thus, the flow is as shown in FIG. 5G. However, the magnetron and fan M3, F2 are turned off. The cool down can proceed for a predetermined period of time, or can proceed until the exhaust air, as sensed by TC2, decreases to a predetermined temperature, for example, 38° C.

As discussed earlier, the valving and cycles described above with reference to FIGS. 5A–5G are exemplary, and each of the components and each of the cycles are not required, since the particular valving and piping arrangements can vary, as can the operating cycles.

Figure 6A:
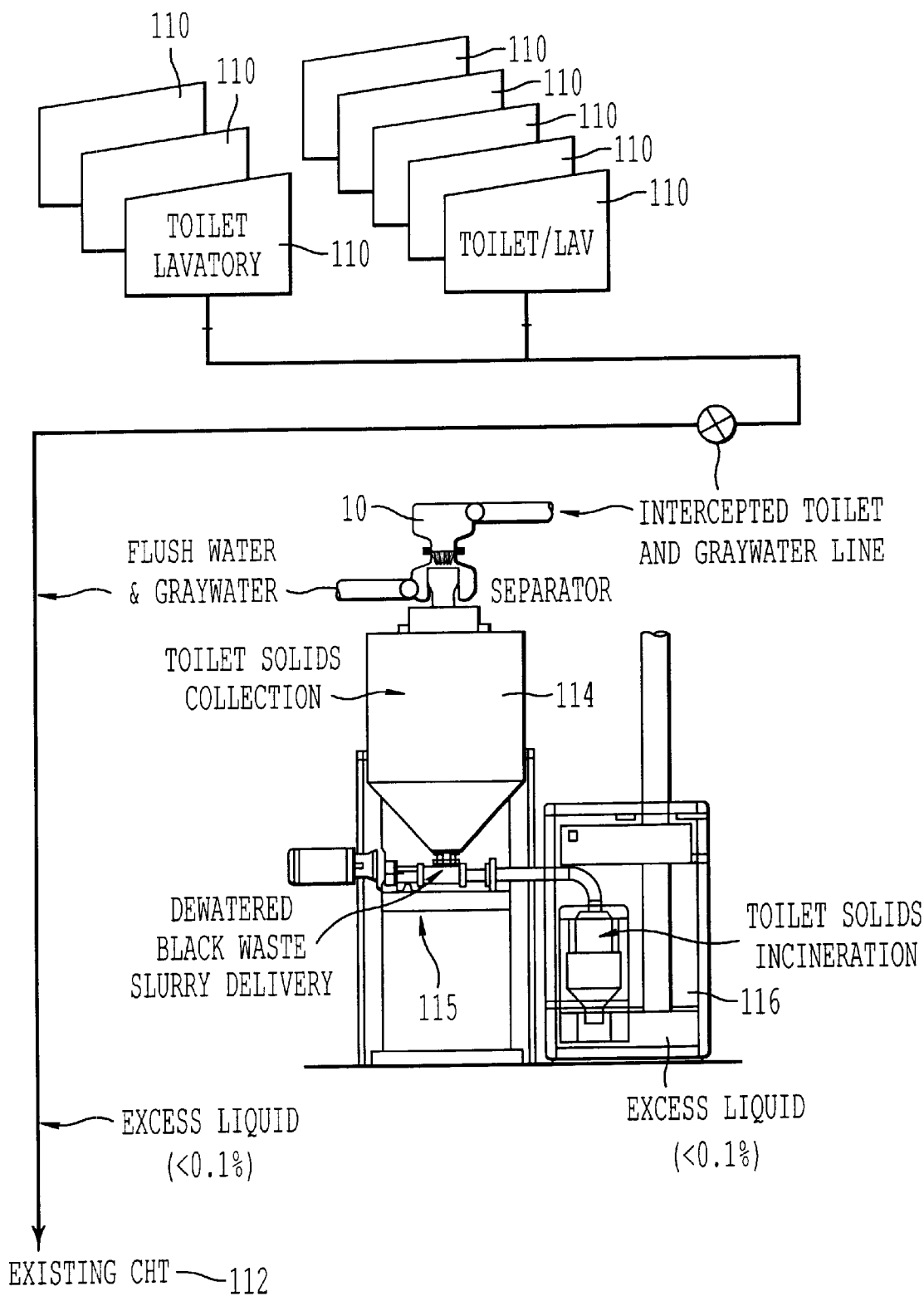
FIGS. 6A and 6B depict examples of systems which can be utilized on marine vessels.
Figure 6B:
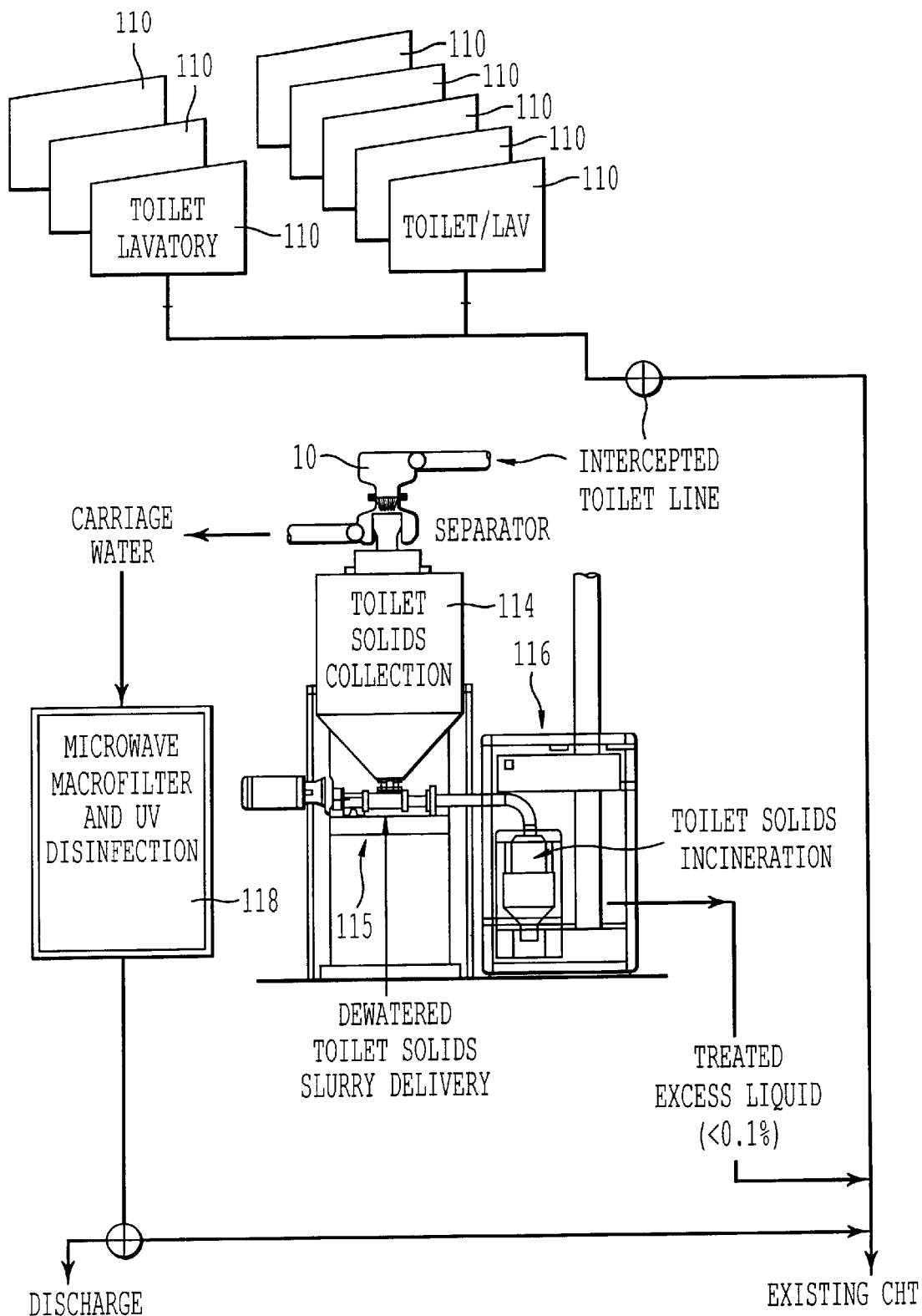

FIGS. 6A and 6B are schematic representations of systems which can be utilized, for example, on board marine vessels. FIG. 6A is a somewhat simplified version in which solids are removed and incinerated, without further treatment of the liquid waste prior to forwarding to the existing CHT (collection holding/transfer tank) or discharged overboard. Nevertheless, the arrangement of FIG. 6A is advantageous in that, in current systems, the entire waste is forwarded to the existing CHT, and ultimately discharged overboard. Such existing systems not only result in undesirable discharges, but also make the existing CHT more difficult to clean. With the arrangement shown in FIG. 6A, the waste which previously was forwarded directly to the CHT is intercepted and forwarded to a separator 10. As mentioned earlier, since the separator can rapidly accommodate substantial volumes of flow, a single separator can be provided for plural toilets or lavatories 110, and thus, even with large or very large marine vessels, only a single or small number of separators 10 are needed. The liquids which exit the separator, such as flush water and gray water, are then forwarded to the existing CHT as indicated at 112. Solids which are removed by the separator are then forwarded to a collection tank 114, from which they are periodically dosed into an incineration assembly 116. The incineration assembly 116 can be the same as that depicted in FIG. 3, however the filter assembly 30 is eliminated. In addition, since the liquids from the separator 10 are forwarded to the existing CHT, the sump can be eliminated, or can be utilized to provide a larger capacity for drainage of solids from the incineration chamber. In either case, the liquids which drain from the solids disposed in the incineration assembly can then be forwarded to the existing CHT.

Preferably, the sump or surge tank which receives liquids draining from the solids to be incinerated also includes a weir assembly as discussed earlier, so that any ash material is retained, and the liquids are then forwarded to the CHT. As indicated in FIG. 6A, the liquids which drain from the solids to be incinerated will typically be less than 0.1% of the total liquid content of the waste which enters the separator 10. Various means 115 can be utilized for forwarding the solid waste from the collection tank 114 to the incineration assembly 116, such as a plunger, auger, or other suitable device.

FIG. 6B is a modified form of the arrangement of FIG. 6A. As in the arrangement of FIG. 6A, the separator receives waste from plural sources 110 (including lavatory, sinks, kitchens, etc.), and forwards the solids to a collection tank 114. The solids are in turn forwarded by suitable means 115 to an incineration assembly 116, and liquids which drain from the solids in the incineration assembly can be forwarded to the existing CHT. In contrast to the arrangement of FIG. 6A, the liquids exiting the separator 10 are further treated as indicated at 118. This additional treatment will include removal of any residual solids utilizing a filter assembly, such as the up-down filter assembly 30 as discussed earlier. Since the amount of liquid to be handled is significantly larger than that of the solids, a plurality of filter assemblies can be provided, or a smaller number of larger sized filter assemblies can be utilized. In addition, a surge or holding tank can be utilized for initially retaining liquids exiting the separator 10, with the liquids then forwarded to one or more filter assemblies. As indicated at 118, additional UV disinfection can optionally be provided. The liquids exiting the liquid treatment system 118 can then be discharged, or optionally, forwarded to the existing CHT.

Systems in accordance with the present invention, as shown in FIGS. 6A and 6B, can be particularly advantageous in that marine pollution standards are becoming more stringent as a result of international convention standards (MARPOL).

Obviously, numerous modifications and variations are possible in light of the above teachings. It is therefore to be understood that, within the scope of the appended claims, the present invention can be practiced otherwise than as specifically disclosed herein.

What is claimed as new and desired to be secured by Letters Patent of the United States is:

1. A filter assembly comprising:
   (a) a housing defining a chamber therein, said housing having:
      (i) a first liquid outlet;
      (ii) a second liquid outlet; and
      (iii) a liquid inlet;
   (b) a first filter element disposed adjacent to said first liquid outlet; and
   (c) a second filter element disposed adjacent to said second liquid outlet,
      wherein said first filter element comprises a first portion and a second portion that are cup-shaped, and
      wherein said first portion is disposed at least partially inside said second portion with said second portion at least partially surrounding said first portion.

2. A filter assembly as recited in claim 1, wherein at least one of said first and second filter elements has a first portion having a first density and a second portion having a second density, and wherein said first density is higher than said second density.

3. A filter assembly as recited in claim 2, wherein said density is a pore density such that said first portion of said filter provides a finer filter portion than said second portion.

4. A filter assembly as recited in claim 3, wherein said at least one of said first and second filter elements comprises a ceramic filter element.

5. A filter assembly as recited in claim 1, wherein said chamber extends in a vertical direction and said first filter element is disposed above said second filter element.

6. A filter assembly as recited in claim 1, further including means for subjecting said first and second filter elements to microwave energy.

7. A filter assembly as recited in claim 1, further including means for drawing liquids from said liquid inlet through said first filter element in a first mode of operation, and through said second filter element in a second mode of operation.

8. A filter assembly as recited in claim 1, wherein said liquid inlet is positioned such that liquids enter said filter assembly at a location between said first filter element and said second filter element.

9. A filter assembly according to claim 1, wherein said first filter element has a cup-shaped portion, and wherein said second filter element has a cup-shaped portion.

10. A filter assembly according to claim 1, wherein at least a portion of said first filter element is formed of a lossy material.

11. A filter element comprising:
    a first portion having a first pore density; and
    a second portion having a second pore density lower than said first pore density;
    wherein said filter element is formed of a ceramic material,
    wherein said first portion and said second portion are cup-shaped, and
    wherein said first portion is disposed at least partially inside said second portion with said second portion at least partially surrounding said first portion.

12. A filter element as recited in claim 11, wherein said filter element includes a lossy material.

13. A filter element as recited in claim 12, wherein said lossy material is a silicon carbide material.

14. A filter element as recited in claim 13, wherein said first portion has a pore density of 30 to 60 pores per inch and said second portion has a pore density of 5 to 30 pores per inch.

15. A filter element according to claim 11, wherein said second portion is downstream of said first portion.

16. A filter assembly comprising:
    (a) a housing defining a chamber therein, said housing having:
       (i) a first liquid outlet;
       (ii) a second liquid outlet; and
       (iii) a liquid inlet;

(b) a first filter element disposed adjacent to said first liquid outlet; and (c) a second filter element disposed adjacent to said second liquid outlet, wherein said liquid inlet is disposed between said first liquid outlet and said second liquid outlet, said filter assembly further including an exhaust outlet disposed between said first and second filter elements.

17. A filter assembly comprising:

(a) a housing defining a chamber therein, said housing having:
  (i) a first liquid outlet;
  (ii) a second liquid outlet; and
  (iii) a liquid inlet;

(b) a first filter element disposed adjacent to said first liquid outlet; and (c) a second filter element disposed adjacent to said second liquid outlet, wherein at least one of said first and second filter elements has a first portion having a first density and a second portion having a second density, wherein said first density is higher than said second density, wherein said density is a pore density such that said first portion of said filter provides a finer filter portion than said second portion, wherein said at least one of said first and second filter elements comprises a ceramic filter element, and wherein said first portion has a pore density in the range of 30 to 60 pores per inch, and said second portion has a pore density of 5 to 30 pores per inch.

18. A filter assembly as recited in claim 17, wherein said at least one of said first and second filter elements comprises a silicon carbide material.

19. A waste treatment system comprising:

(a) a separator which separates a waste stream into first and second components, wherein said first component is primarily solid and said second component is primarily liquids;

(b) incinerator means which receives solids of said first component and which incinerates said solids, said incinerator means including a microwave cavity;

(c) a gate valve disposed between said separator and said incinerator means, said gate valve having a valve passageway and a closure member having an opening therethrough, said closure member being configured to slide linearly between an open position where said opening is aligned with said valve passageway and a closed position where said opening does not overlap with said valve passageway; and (d) a tank which receives said second component and a filter assembly connected to said tank for receiving liquids from said tank, wherein each of said separator, said incinerator means and said filter assembly are disposed in a housing.

20. A waste treatment system comprising:

(a) a separator which separates a waste stream into first and second components, wherein said first component is primarily solid and said second component is primarily liquids;

(b) incinerator means which receives solids of said first component and which incinerates said solids, said incinerator means including a microwave cavity;

(c) a gate valve disposed between said separator and said incinerator means, said gate valve having a valve passageway and a closure member having an opening therethrough, said closure member being configured to slide linearly between an open position where said opening is aligned with said valve passageway and a closed position where said opening does not overlap with said valve passageway; and (d) a tank which receives said second component and a filter assembly connected to said tank for receiving liquids from said tank, wherein said filter assembly includes a housing defining a chamber which extends in a vertical direction, said filter assembly further including first and second filter elements, wherein said first filter element is disposed above said second filter element, wherein a conduit extends from said tank to a liquid inlet of said filter assembly, and wherein said liquid inlet is disposed such that liquids enter said filter assembly at a location between said first and second filter elements.

21. A waste treatment system as recited in claim 19, further including pump means disposed downstream from said filter assembly for drawing liquid through said first filter element by suction.

22. A waste treatment system comprising:

(a) a separator which separates a waste stream into first and second components, wherein said first component is primarily solid and said second component is primarily liquids;

(b) incinerator means which receives solids of said first component and which incinerates said solids, said incinerator means including a microwave cavity;

(c) a gate valve disposed between said separator and said incinerator means, said gate valve having a valve passageway and a closure member having an opening therethrough, said closure member being configured to slide linearly between an open position where said opening is aligned with said valve passageway and a closed position where said opening does not overlap with said valve passageway; and (d) a tank which receives said second component and a filter assembly connected to said tank for receiving liquids from said tank, wherein said filter assembly includes first and second filter elements, and wherein said filter assembly further includes a liquid inlet disposed at a location such that liquids are introduced at a location between said first and second filter elements.

23. A waste treatment system as recited in claim 21, wherein at least one of said first and second filter elements is formed of a ceramic material and includes a first portion having a first pore density and a second portion having a second pore density which is lower than said first pore density.

24. A waste treatment system as recited in claim 22, wherein said first pore density is in the range of 30–60 pores per inch and said second pore density is in the range of 5 to 30 pores per inch.

25. A waste treatment system comprising:

(a) a separator which separates a waste stream into first and second components, wherein said first component is primarily solid and said second component is primarily liquids;

(b) incinerator means which receives solids of said first component and which incinerates said solids, said incinerator means including a microwave cavity;

(c) a gate valve disposed between said separator and said incinerator means, said gate valve having a valve passageway and a closure member having an opening therethrough, said closure member being configured to slide linearly between an open position where said opening is aligned with said valve passageway and a closed position where said opening does not overlap with said valve passageway; and (d) a tank which receives said second component and a filter assembly connected to said tank for receiving liquids from said tank, wherein said filter assembly comprises at least one ceramic filter element which includes a first portion having a first pore density and a second portion having a second pore density, and wherein said first pore density is higher than said second pore density.

26. A waste treatment system comprising:

(a) a separator which separates a waste stream into first and second components, wherein said first component is primarily solid and said second component is primarily liquids;

(b) incinerator means which receives solids of said first component and which incinerates said solids, said incinerator means including a microwave cavity;

(c) a gate valve disposed between said separator and said incinerator means, said gate valve having a valve passageway and a closure member having an opening therethrough, said closure member being configured to slide linearly between an open position where said opening is aligned with said valve passageway and a closed position where said opening does not overlap with said valve passageway;

(d) a tank which receives said second component and a filter assembly connected to said tank for receiving liquids from said tank; and (e) a wet venturi air scrubber for removing exhaust particulates, and wherein said wet venturi air scrubber is positioned and arranged to receive exhaust gases produced by said incinerator means.

27. A waste treatment system comprising:

(a) a separator which separates a waste stream into first and second components, wherein said first component is primarily solid and said second component is primarily liquids;

(b) incinerator means which receives solids of said first component and which incinerates said solids;

(c) a tank which receives said second component; and (d) a filter assembly connected to said tank for receiving liquids from said tank, wherein said incinerator means includes a microwave cavity, the system further including a valve disposed between said separator and said incinerator means, said valve including means for preventing waste from said separator from entering said microwave cavity in a closed position and means for delimiting an end of said microwave cavity in said closed position, wherein said valve is a gate valve, and wherein a closure member of said gate valve comprises a metal member having a non-stick coating, and further wherein a grooved portion is provided at a location spaced radially outside of a flow passage through said valve at least when said valve is in said closed position, wherein said grooved portion is spaced by a distance of one-fourth of a microwave wavelength outside of said flow passage.

28. A filter assembly comprising:

(a) a housing defining a chamber therein, said housing having:
  (i) a first liquid outlet;
  (ii) a second liquid outlet; and
  (iii) a liquid inlet;

(b) a first filter element disposed adjacent to said first liquid outlet; and (c) a second filter element disposed adjacent to said second liquid outlet, wherein said first filter element comprises a first portion having a first pore density, and a second portion having a second pore density lower than said first pore density;

wherein said filter element is formed of a ceramic material, wherein said first portion and said second portion are cup-shaped, wherein said first portion is disposed at least partially inside said second portion with said second portion at least partially surrounding said first portion, and wherein said first portion includes a lossy material.

29. A filter element comprising:

a first portion having a first pore density; and a second portion having a second pore density lower than said first pore density, wherein said filter element is formed of a ceramic material, wherein said first portion and said second portion are cup-shaped, wherein said first portion is disposed at least partially inside said second portion with said second portion at least partially surrounding said first portion, and wherein said first portion includes a lossy material.

30. A filter element comprising:

a first portion having a first pore density;

a second portion having a second pore density lower than said first pore density; and wherein said filter element is cup-shaped, said first portion is disposed at least partially inside said second portion with said second portion at least partially surrounding said first portion, and wherein said filter element is formed of a ceramic material.

31. A filter element as recited in claim 30, wherein said first portion includes a lossy material.

* * * * *